United States Patent [19]
Smith, Jr. et al.

[11] Patent Number: 5,138,990
[45] Date of Patent: * Aug. 18, 1992

[54] IN-LINE CYLINDER HEAD FOR INTERNAL COMBUSTION ENGINE

[75] Inventors: Richard W. Smith, Jr.; Michael E. Smith, both of Wooster, Ohio

[73] Assignee: TFS, Inc., Wooster, Ohio

[*] Notice: The portion of the term of this patent subsequent to Apr. 24, 2007 has been disclaimed.

[21] Appl. No.: 805,390

[22] Filed: Dec. 9, 1991

Related U.S. Application Data

[63] Continuation of Ser. No. 448,712, Dec. 11, 1989, Pat. No. 5,076,224, which is a continuation of Ser. No. 166,521, Mar. 10, 1988, Pat. No. 4,919,092, which is a continuation-in-part of Ser. No. 94,125, Sep. 8, 1987, Pat. No. 4,773,382, which is a continuation of Ser. No. 47,295, May 8, 1987, abandoned, which is a continuation of Ser. No. 759,747, Jul. 29, 1985, Pat. No. 4,686,948.

[51] Int. Cl.⁵ ............................................. F02B 23/08
[52] U.S. Cl. ................................. 123/193.5; 123/306; 123/188.12; 123/60
[58] Field of Search ................ 123/193.5, 188.14, 306, 123/193.1, 661, 662, 657

[56] References Cited

U.S. PATENT DOCUMENTS

| | | | |
|---|---|---|---|
| 2,770,227 | 11/1956 | Haigh et al. | 123/661 |
| 4,092,969 | 6/1978 | Ono et al. | 123/193.5 |
| 4,159,011 | 6/1979 | Sperry | 123/193.5 |
| 4,228,653 | 10/1980 | Sperry | 123/193.5 |
| 4,289,099 | 9/1981 | Nakanishi et al. | 123/193.5 |
| 4,480,625 | 11/1984 | Kanda et al. | 123/661 |
| 4,519,350 | 5/1985 | Oda et al. | 123/188.14 |
| 4,537,028 | 8/1985 | Humke | 123/193.5 |
| 4,545,101 | 10/1985 | Hilts | 123/193.5 |
| 4,548,175 | 10/1985 | Kawai et al. | 123/188.14 |
| 4,549,510 | 10/1985 | Miyakoshi et al. | 123/432 |
| 4,628,880 | 12/1986 | Aoyama et al. | 123/188.14 |
| 4,686,948 | 8/1987 | Smith et al. | 123/193.5 |
| 4,745,890 | 5/1988 | Wyczalek et al. | 123/193.5 |
| 4,773,382 | 9/1988 | Smith et al. | 123/195.5 |
| 4,919,092 | 8/1990 | Smith et al. | 123/193.5 |
| 4,951,642 | 8/1990 | Hashimoto et al. | 123/193.5 |
| 5,042,440 | 8/1991 | Joseph | 123/193.5 |

Primary Examiner—WIllis R. Wolfe
Assistant Examiner—M. Macy
Attorney, Agent, or Firm—Body, Vickers & Daniels

[57] ABSTRACT

An improved cast cylinder head for a high performance internal combustion engine is provided by an especially configured quench surface from which a contoured combustion chamber extends having a metal mass buildup shrouding the exhaust gases through the exhaust valve seat. A metal mass buildup configuration is also provided about the intake valve seat which acts in conjunction with an especially configured and proportioned valve intake passage to draw the fuel-air mixture into the combustion chamber in an unshrouded, helical flow pattern. The intake passageway configuration is such that a rich fuel-air mixture is drawn through the intake valve seat at a portion thereof remote from said exhaust valve seat while a lean fuel-air mixture exits the intake valve seat adjacent the exhaust valve seat. Positioning the fuel-air mixture in such a manner in combination with the unshrouded metal mass buildup minimizes short-circuiting of the fuel through the exhaust valve seat in a valve overlap condition.

30 Claims, 19 Drawing Sheets

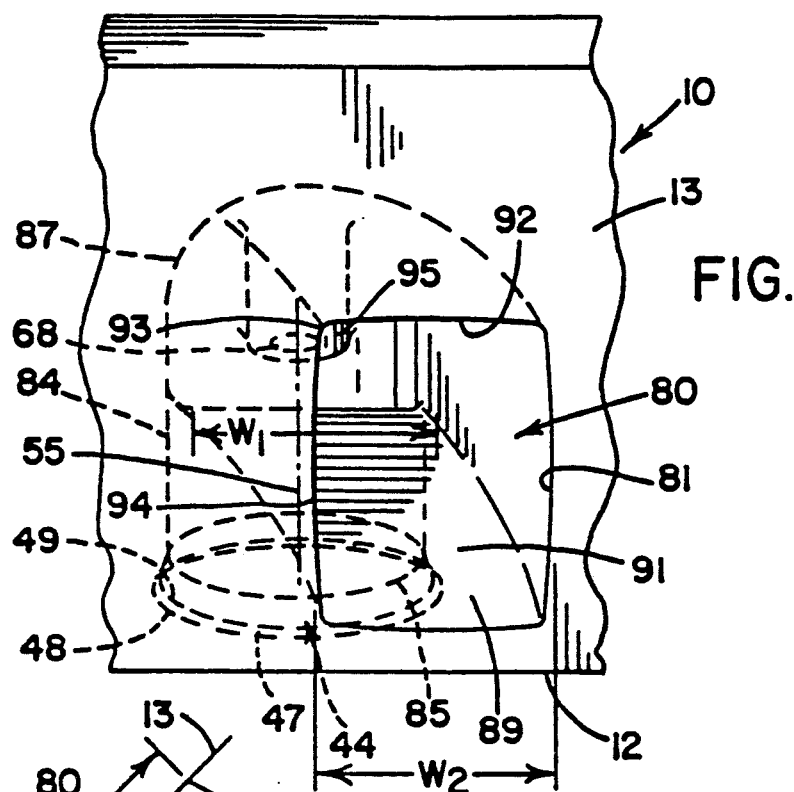
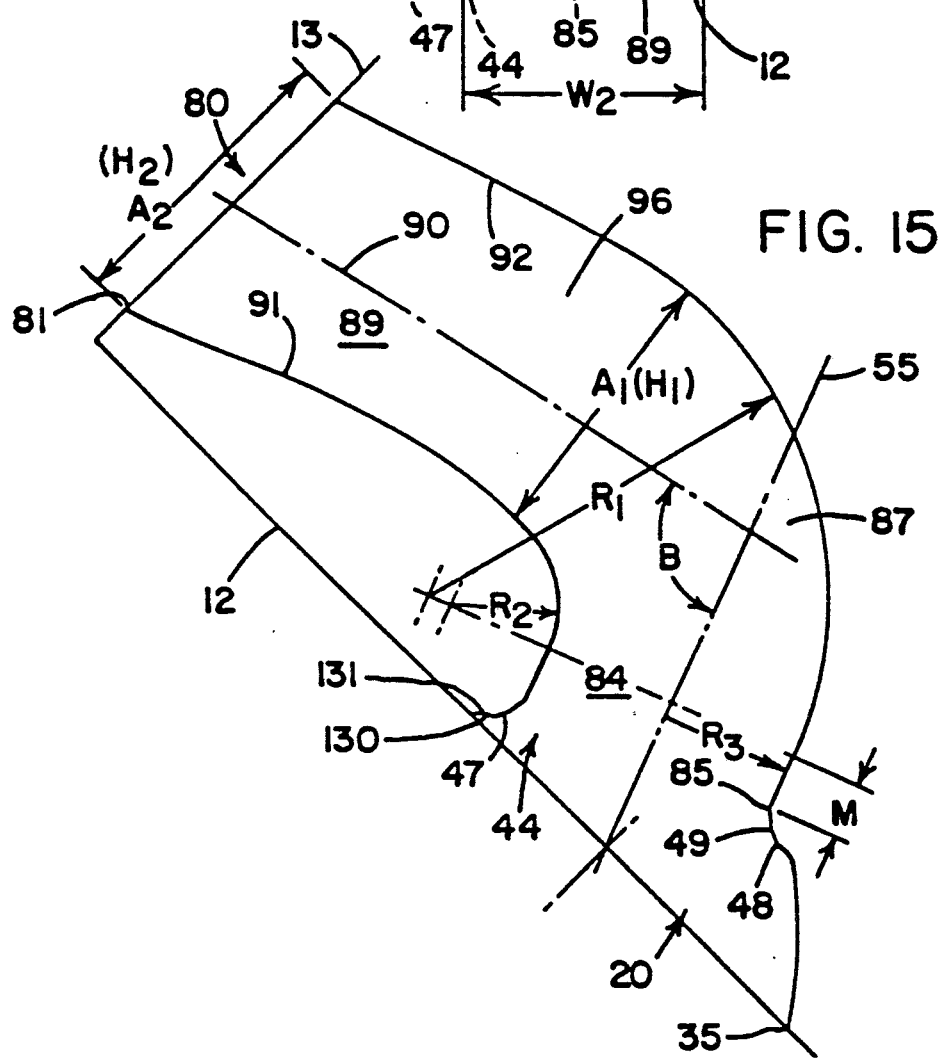
FIG. 14
FIG. 15

IN-LINE CYLINDER HEAD FOR INTERNAL COMBUSTION ENGINE

RELATED APPLICATIONS

This application is a continuation of U.S. patent application Ser. No. 448,712 filed Dec. 11, 1989, now U.S. Pat. No. 5,076,224, which is a continuation of Ser. No. 166,521 filed on Mar. 10, 1988, now U.S. Pat. No. 4,919,092, which is a continuation-in-part of U.S. patent application Ser. No. 094,125 filed on Sep. 8, 1987, now U.S. Pat. No. 4,773,382, which is a continuation of Ser. No. 047,295 filed on May 8, 1987, now abandoned, which is a continuation of Ser. No. 759,747 filed on Jul. 29, 1985, now U.S. Pat. No. 4,686,948.

The present invention relates generally to internal combustion engines of the type operated by combusting a mixture of fuel such as gasoline with air and more particularly to an improved cylinder head and head and valve arrangement which is especially suitable for use with high performance internal combustion engines.

The invention is particularly applicable to a cylinder head having an in-line, push rod valve arrangement and employing wedge-shaped combustion chambers and will be described with particular reference to its use on high performance engines for off-highway vehicular applications such as dragsters and the like. However, the invention has broader applications and, with some modifications, may be used in "limited editions" of mass produced automotive vehicles having high output, performance orientated engines or in commercial vehicle applications. Also, the invention, while particularly suited to an in-line push rod valve train is not necessarily limited to such arrangement, and in principle, can be applied to combustion chambers other than those of a wedge shaped configuration.

BACKGROUND

There is a need for high performance cylinder heads which can be simply retrofitted onto existing short blocks for off-highway, high horsepower automotive application. There is also a need for a limited, mass production, high performance cylinder heads for "limited editions" of certain automobiles having high performance capabilities which can generate a suitable torque curve over the load speed range. In addition, there is a need for mass produced high performance, gasoline fueled, internal combustion engines for power generators and commerical truck applications which can compete with diesel engines.

In considering the design of any high performance cylinder head, one that achieves high horsepower coordinated and matched with increased torque, there are a number of basic, engine-valve train as well as head considerations that might be initially considered. For example, it is known that an in-line valve arrangement in the head driven by conventional push rods from a single cam shaft within the short block provides certain inherent features ideally suited for high performance engines of the type this invention relates to which is not present, for example, in an overhead, camshaft arrangement. The basic shape of the combustion chamber must be considered (wedge shaped or hemispherical) and it is known that conventional, wedge shaped chambers allow for a flat burn control surface, known as a "quench" surface and it is known to modify the shape of the quench surface to achieve certain distribution of gas flows within the head. Another consideration rests in the shape of the piston head and it is known that flat head pistons are particularly desirable for use with wedge shaped combustion chambers for the applications to which the present invention is particularly suited. The volumetric size and accordingly, the compression ratio, must be established. It is a common practice to achieve an increase in the combustion ratio of the engine by deck milling the mounting surface of the head to reduce the size of the combustion chamber. The actual valve sizes must be established within the confines of the space available in the combustion chamber and then matched to the desired horsepower and the torque.

Once the general design of the head is established by considering factors such as those discussed above, the specific objective becomes one of determining how to contour the combustion chamber and form the runners or intake and exhaust passages in the head to permit adequate ingress and egress of the gases so that the internal combustion engine can adequately "breathe" at high speed. More specifically, when the valve area in the combustion chamber is significantly increased to improve horsepower, eddy flow currents are established, the effects of which hinder the intake of the gases into and the exhaust of the gases out of the combustion chamber. In addition, since the valves must be placed closely adjacent one another a shrouding effect occurs therebetween causing an uneven flow of the gases about the valves.

One approach, discussed in the cited article and now almost uniformly followed to improve "breathing" is the use of multiple valves in each combustion chamber. While the benefits of a multi-valve application for general purpose automotive use is not questioned, the application of multiple valves for the high performance internal combustion engines to which this invention relates is not practical. Such an arrangement requires overhead camshafts and the associated timing chain which does not afford the precise opening and closing of the valves at high speed inherently present in the push rod arrangement while also providing a further drain of engine power. More importantly though, is the simple fact that for a given combustion chamber size, two valves can occupy a greater space than three or four valves.

A more sensible approach to provide improved breathing in a two-valve arrangement is set forth in our parent patent. In our prior patent we contoured the chamber, modified the quench surface, and added a mass buildup to a portion of the chamber to achieve a funnelled, increased velocity, gas flow to and from the seats. This dramatically improved the breathing and consequently the horsepower and torque of the internal combustion engine at high speeds (i.e. in excess of 5,000 rpm). Such problems have been significantly eliminated, in good part, by contouring the combustion chamber to, in effect by funneling the gases to and from the valve seats by an especially configured contour which extended from the seats to the quench surface. In our parent patent and in keeping with the philosophy of increased velocity and mass flow through the valve seats, the exhaust and intake runners or passageways in the head were likewise modified to permit ingress and egress of the gases with as little back pressure as possible. More specifically, the intake valve passageway was modified to provide a flow restriction in the runner or passageway to increase the velocity of the air flow through the intake passageway while maintaining a high mass flow. It was found in certain high speed instances (well in excess of 5,000 rpm) that the gasoline in the fuel-air mixture admitted into the intake passageway from the fuel injectors did not completely atomize or "splashed" resulting in an uneven burning of the mixture within the chamber. It was also discovered that because of the close spacing between the valves (and despite the funnel contoured shape of the chamber including the mass buildup) at very high speed operation, at which time the exhaust valve is not completely seated while the intake valve is opening (i.e. valve overlap), a portion of the fuel-air mixture exiting the intake runner through the intake valve was sucked or short circuited out the exhaust valve. This results in a smaller volume of fuel-air mixture within the combustion chamber for combustion purposes than that which would otherwise be available while also exhausting the unburnt mixture as an emission pollutant.

A problem unrelated to the high speed performance of our improved head inherent in all modified, high performance engines is the inability of the internal combustion engine to produce acceptable torque at lower speeds or rpms. This presents a limitation in the use of the cylinder head of our prior invention in commercial vehicles and to some extent, in the high performance, limited edition vehicles occasionally produced by the automobile manufacturers. Again, the approach followed in the art was to increase engine torque by increasing the air flow into the combustion chamber at lower speeds.

SUMMARY OF THE INVENTION

It is thus a principal object of the present invention to provide a cast cylinder head for a gasoline powered, internal combustion engine having improved breathing characteristics.

This object along with other features of the present invention is achieved in a cast cylinder head for an internal combustion engine where the head includes a flat mounting surface and has for each of several, in-line circular piston areas a wedge shaped combustion chamber. The wedge shaped combustion chamber extends from the mounting surface and is defined by an especially configured, closed peripheral edge surface forming the opening of the combustion chamber. Extending from a continuous first portion of the peripheral edge surface is a concave, contoured first cavity area tapering into the head and away from the mounting surface at a generally inclined first angle. A concave, contoured second cavity area extends form the remaining portion of the peripheral edge surface and tapers into the head and away from the mounting surface at a generally inclined second angle, the second angle being steeper or greater than the first angle and the cavity areas intersecting one another along a roof line. A frusto-conical, intake valve seat is formed in the first cavity area, the intake seat having a major diameter circular edge surface and a minor diameter circular edge surface concentric with an intake valve axis and orientated so that the major diameter surface is spaced closer to the mounting surface of the head than the minor diameter surface. For reference purposes, the intake valve seats can be divided, approximately, into adjacent, sequentially numbered first, second, third and fourth quadrants with the second and third quadrants generally adjacent the peripheral edge surface and the fourth quadrant generally adjacent the second cavity area of the combustion chamber. Similarly, a frusto-conical exhaust valve seat is also formed in the first cavity area with a major diameter circular edge surface and a minor diameter circular edge surface concentric with an exhaust valve axis and similarly orientated so that the major diameter surface is closer to the mounting surface than the minor diameter surface. For reference purposes, the exhaust valve seat may likewise be divided into adjacent, sequentially numbered first, second, third and fourth quadrants with the second and third quadrants generally adjacent the peripheral edge surface and the fourth quadrant generally adjacent the second cavity area. The first quadrant of the exhaust valve seat and the first quadrant of the intake valve seat are adjacent or face one another. A spark plug bore is positioned in the second cavity area generally between the intake and exhaust valve axes and an intake passage means is provided in the head to be in fluid communication with the intake valve seat while an exhaust passage means is provided in the head to be in fluid communication with the exhaust valve seat. In the first cavity area and concentrically extending from the major diameter edge surface of the exhaust valve seat in a plane somewhat perpendicular to the exhaust valve axis is an annular exhaust spacing surface and extending from the exhaust spacing surface to the peripheral edge surface about at least portions of said second and third quadrants is a generally frusto-conical, funnelling surface for funnelling exhaust gases in a shrouded manner from the combustion chamber through the exhaust valve seat. Also, within the first cavity area there is an annular intake spacing surface concentrically extending from the major diameter circular edge surface of the intake valve seat in a plane generally perpendicular to the intake valve axis and extending from the intake spacing surface about at least portions of the second and third quadrants to the peripheral edge surface is a generally arcuate, concave surface. This arcuate, concave surface permits the fuel-air mixture to be drawn into the combustion chamber pass the intake valve seat in an unshrouded manner in contrast to the funnelling action about the exhaust valve seat whereby a substantial portion of a rich gas-air mixture is maintained away from the exhaust valve seat to avoid short circuiting through the exhaust valve seat.

In accordance with a significant aspect of the invention, the intake passageway is especially configured to permit a sufficient fuel-air volume to be drawn into the combustion chamber but in a manner where turbulence of the fuel is minimized while the air, in combination with the configuration of the combustion chamber, is swirled in a helical fashion. The intake passageway comprises a generally rectangular cross-section trough passage commencing at a rectangular intake opening in the intake manifold surface of the cylinder block, a cylindrical base passage commencing at the intake valve seat and a bowl shaped, transition passage between the base passage and trough passage. Contrary to normal design practice which tends to provide a venture effect within the intake passageway to increase velocity and flow of the fuel-air mixture, the trough passage in the present invention gradually increases in cross-section, in a controlled manner, from the intake opening to the intersection plane between the trough and transition passage whereat the rectangular cross-sectional area equals the area of the head of the intake valve. Importantly, the width dimension increase is optimized relative to the height dimension decrease to minimize turbulence tending to permit the heavier fuel particles or at least any gas droplets to move towards the bottom of the longitudinally extending trough passage. The transition and base passages are sized relative to the intake valve area to produce a heavier or rich fuel-air mixture on one side of the intake valve remote from the exhaust valve while a lighter or leaner fuel-air mixture emanates from the opposite side adjacent the exhaust seat. Additionally, there is an inner cylindrical core of a very lean fuel-air mixture drawn uniformly past the intake valve. This results in a leaner air-fuel mixture adjacent the exhaust valve shielding any short circuiting of the rich fuel-air mixture through the exhaust valve in a valve "overlap" condition to improve the efficiency of the combustion chamber. The geometry of the intake passage is specifically defined relative to the intake valve's diameter and produces the aforementioned results. In addition to sizing the base passage and transition passage in combination with the unshrouded combustion chamber intake valve seat and the configuration of the chamber thereabout, tends to impart a helical swirl which is more pronounced relative to the heavier or richer fuel-air mixture. Thus it is believed that while the inner lean core of very lean fuel-air mixture is uniformly drawn past the intake valve, the richer fuel-air mixture remote from the exhaust valve seat is swirled in a helical manner and drawn downward in the combustion chamber to pass over the head of the exhaust valve, the space between exhaust valve head and chamber being occupied by the lean fuel-air mixture.

In accordance with other particularly important aspects of the invention, the peripheral edge surface which defines the quench surface is especially configured in shape by projections of the arcuate, concave surface and the frusto-conical surface over certain segments thereof while constructed of arcuate segments over a certain portion thereof. Specifically, there is formed a V-shaped velocity increasing point from the intersection of two adjacent peripheral edge arcuate segments. The velocity increasing point in turn defines a ridge line which extends between and blends into the exhaust spacing surface and intake spacing surface at a point at least where the intake and exhaust valve seats are closest to one another. On each side of the ridge line is a metal mass buildup. The metal mass on the side of the ridge line adjacent the exhaust valve seat blends in a frusto-conical manner from the ridge line to the exhaust spacing surface along a circular line extending to the peripheral edge surface and functioning as a velocity increasing protuberance funnelling exhaust gases uniformly through the exhaust valve seat. The metal buildup on the side of the ridge line adjacent the intake valve seat blends in a concave, arcuate manner from the ridge line to the intake spacing surface and along a helical or elliptical line extending to the peripheral edge surface. In this respect the concave arcuate surface formed in the third and second quadrants of the intake valve likewise blends into said intake spacing surface along a helical or elliptical line extending from the third to the second quadrant to the peripheral edge surface whereby the fuel-air mixture is drawn from the intake passageway in a helical, swirling manner through the intake valve seat. The helix of the swirl is sufficient to permit a rich fuel-air mixture to pass over the head of the exhaust valve avoiding short circuiting while also cooling the exhaust valve head.

In accordance with another feature of the invention, the exhaust passageway is spaced closely adjacent the intake passageway with the result that the heat from the relatively hot exhaust gases is transmitted through the separating wall in the cast head (which is reduced in the chamber) to heat the relatively cold fuel-air mixture within the intake passageway portion adjacent the exhaust passageway to produce a lean fuel-air mixture over such portion of the intake passageway which is adjacent the exhaust valve seat. The lean fuel-air mixture is utilized to prevent short circuiting of the richer fuel-air mixture at the opposite side of the intake passageway remote from the exhaust valve seat.

In accordance with another feature of the invention, the peripheral edge surface overlies the piston containing cylinder such that one point on the peripheral edge adjacent the exhaust valve is tangential in an overlying relationship to the cylinder wall while the diametrically opposite point on the peripheral edge is spaced radially-inwardly in an overlying relationship to the cylindrical wall. The centers of the intake valve is thus shifted with respect to the center of the cylinder to enhance the suction of the heavier or richer fuel-air mixture through one side of the intake valve seat while the lighter or leaner fuel-air mixture is drawn uniformly, in a swirling manner, past the intake valve seat.

In accordance with yet another feature of the invention, a high performance cylinder head of the general type described is used in combination with an internal combustion engine where the valve train is in-line, the valves are of the poppet type with only one exhaust valve and one intake valve for each combustion chamber and a push rod for actuating each valve form a camshaft positioned within the engine's short block through a rocker arm in a conventional manner. This is perhaps the most inexpensive, conventional valve arrangement which can be employed. Within each intake passageway of the type generally described above a partition wall extends along a substantial portion of the passageway and divides the intake passageway into first and second intake passages. Fuel means are provided for injecting or metering precise amounts of fuel into the first and second passages. Valve means associated with the first intake passage of each combustion chamber are provided to close the first passage to the flow of air in the closed position and open the first passage to the flow of air in an open position. A microprocessor is then provided to sense the speed of the internal combustion engine and actuate the valve means from a closed position when the engine speed is low while stopping any metering of fuel in the first passage and actuating the valve means to the open position when the engine speed is high while simultaneously activating the fuel means to meter the fuel into the first passage. Contrary to normal practice, by regulating the flow of fuel and air at low engine speed into the intake passage so that a lesser mass of fuel-air mixture is available to the engine at lower speed, a higher torque is produced. In accordance with another aspect of the invention in this respect, the first and second passages are of equal area, the intake passageway is constructed substantially as defined above and the passageway partition is straight with the microprocessor actuating the valving means and fuel metering means at operating engine speeds greater than about 5,000 rpm.

It is thus another object of the present invention to provide an improved cast cylinder head for high performance internal combustion engines of the type using a mixture of air and liquid fuel, which cast head can be mass produced and still create high horespower, high flow rates within the constraints imposed by standard production short blocks.

In accordance with another object of the present invention, there is provided an improved cast head for high performance internal combustion engines, as defined above, which head produces an improved flow of fuel and air through the intake valve during the intake cycle increasing the efficiency of the internal combustion engine.

It is yet another object of the present invention to provide an improved cast head for an internal combustion engine which minimizes short-circuiting of the fuel through the exhaust valve seat during the intake stroke of the internal combustion engine.

Yet another object of the present invention is to provide a cast cylinder head for a high performance internal combustion engine which uses only one exhaust and one intake valve in a wedge shaped combustion chamber.

Still another object of the present invention is to provide an improved wedge shaped combustion chamber using an improved quench surface with a velocity increasing protuberance funneling the flow of exhaust gases through the exhaust port while also providing an improved draw of the fuel-air mixture past the intake valve.

Still yet another object of the invention is to provide in a cast cylinder head an especially configured intake valve passageway which improves engine performance.

Yet another object of the invention is to provide a cast cylinder head capable of providing high horsepower with high torque at engine operating speeds in excess of 5,000 rpm while also providing a mechanism to produce improved torque from the same internal combustion engine at lower operating speeds.

Still yet another object of the present invention is to provide high performance cast cylinder head which is especially suitable for use with an internal combustion engine which can be constructed from a conventional, low cost which can be constructed from a conventional, low cost design.

Still yet another object of the invention is to provide a cast cylinder head for an internal combustion engine which achieves higher efficiencies resulting from a more complete combustion of the fuel-air mixture than that of conventional designs while also reducing the amount of pollutants discharged during operation.

A still further object of the invention is to provide an improved cast cylinder head in combination with a conventional valving arrangement for use on a high performance internal combustion engine.

A still further object of the invention is to provide an improved cast head in combination with a conventional push rod, internal combustion engine which significantly increases the horsepower and torque of such engines.

These and other objects and advantages of the present invention will become apparent from the following description taken together with the drawings which are set forth in the next section.

BRIEF DESCRIPTION OF THE DRAWINGS

The present invention relates to a unique configuration of a wedge type head for use on a standard engine block to convert the standard block into a competitive engine and it will be described by the accompanying drawings. The drawings show the preferred embodiment of the invention and illustrate the inventive concepts of the invention when they relate to unique contours, angles and metal build-up.

FIG. 14 is a side schematic view of the intake passage taken along lines 14—14 of FIG. 12;

FIG. 15 is an end view illustrating the basic geometry used in constructing the intake passageway of the present invention;

DETAILED DESCRIPTION OF THE PREFERRED EMBODIMENT

Figure 1:
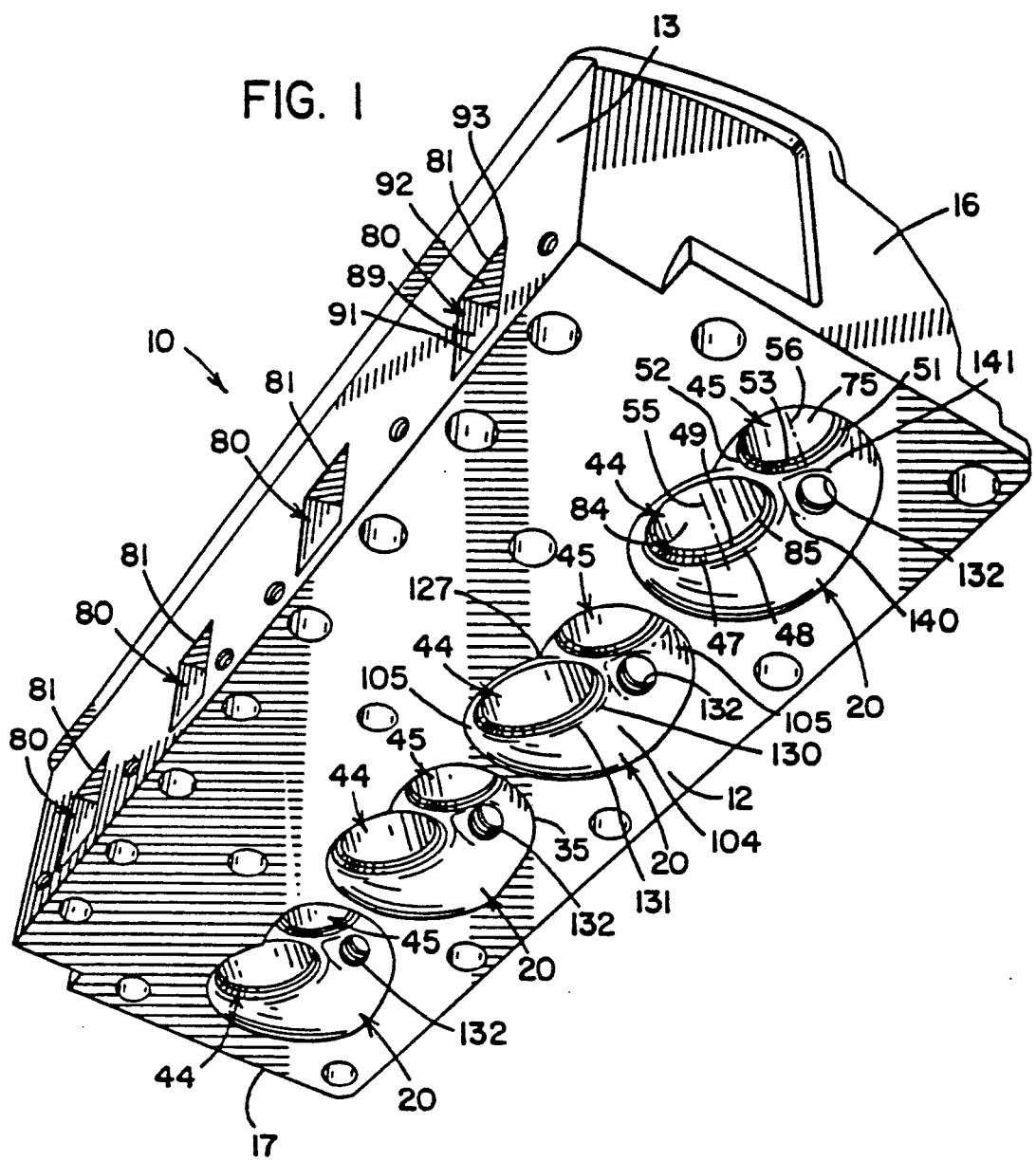
FIG. 1 is a bottom pictorial view of a head constructed in accordance with the present invention.

Referring now to the drawings wherein the showings are for the purpose of illustrating the present invention, there is shown a cast cylinder head 10 of a conventional, generally rectangular configuration. Head 10 as illustrated is for use in a V-8 engine and dimensions cited in this specification are applicable to the 302 cubic inch Ford V-8 engine although the invention is not limited in scope to that particular engine or to a V-8 engine in general. Since a V-8 application is disclosed, head 10 is adapted to be mounted in a conventional manner to the short block of the V-8 engine to cover or cap one bank of four separate cylinders, each containing a reciprocating piston. A second head is then used to cap or cover the other bank of four cylinders with their associated pistons. Because the heads 10 are identical for each cylinder bank, only one head will be described in this specification.

Referring now to FIG. 1 which shows an underside view, head 10 has a generally flat mounting surface 12 and extending from one side of mounting surface 12 is an intake manifold surface 13 to which an intake manifold (not shown in FIG. 1 but see the alternative embodiment shown in FIG. 19) is mounted in a conventional manner and on the opposite side of mounting surface 12 is an exhaust manifold surface 14 to which the headers of the exhaust manifold (not shown) are also mounted in a conventional manner. End surfaces 16, 17 extend upwardly from mounting surface 12 to define the general rectangular shape of head 10. Extending from mounting surface 12 into head 10 are a plurality of combustion chambers 20, specifically four combustion chambers are illustrated for head 10. Since each combustion chamber 20 is identical to the other, only one combustion chamber 20 will be described.

Figure 2:
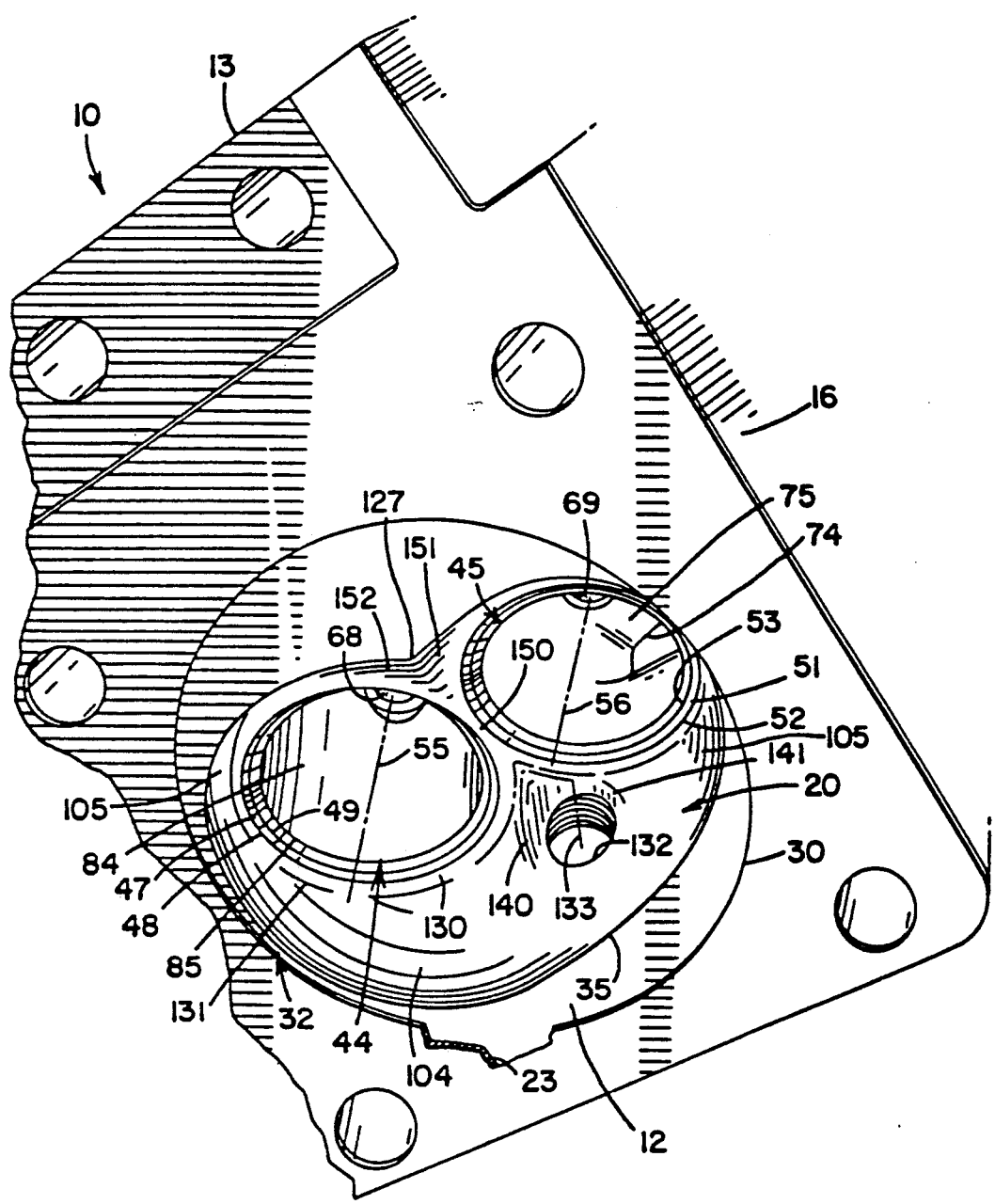
FIG. 2 is an enlarged partial view of the head shown in FIG. 1 with a head gasket in place to illustrate the position of the cylinder in the joined block with respect to each of several combustion chambers of the head shown in FIG. 1.
Figure 3:
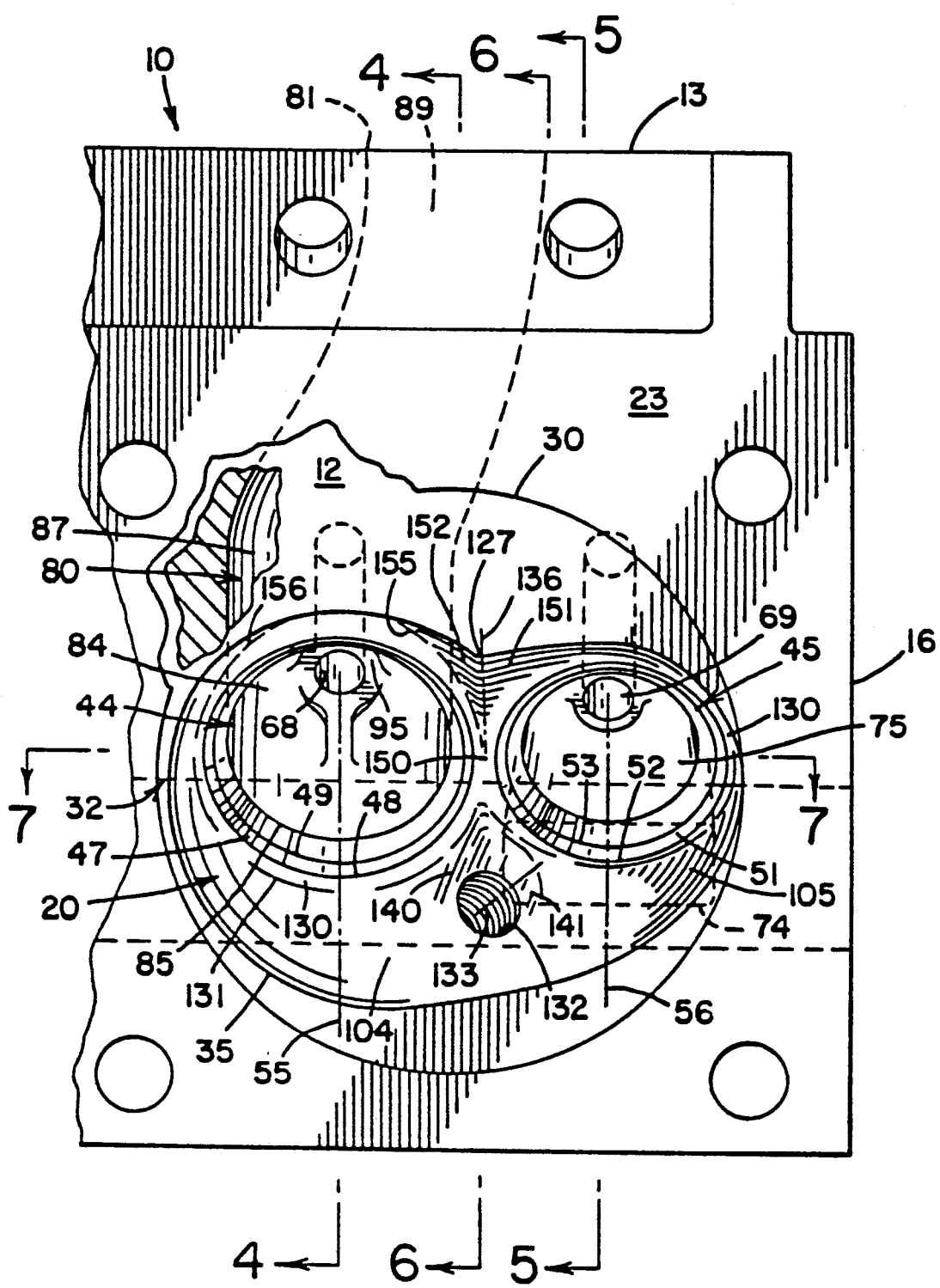
FIG. 3 is a pictorial view similar to FIG. 1 with certain portions of the head broken away to better illustrate the intake passageway of the present invention.
Figure 8:
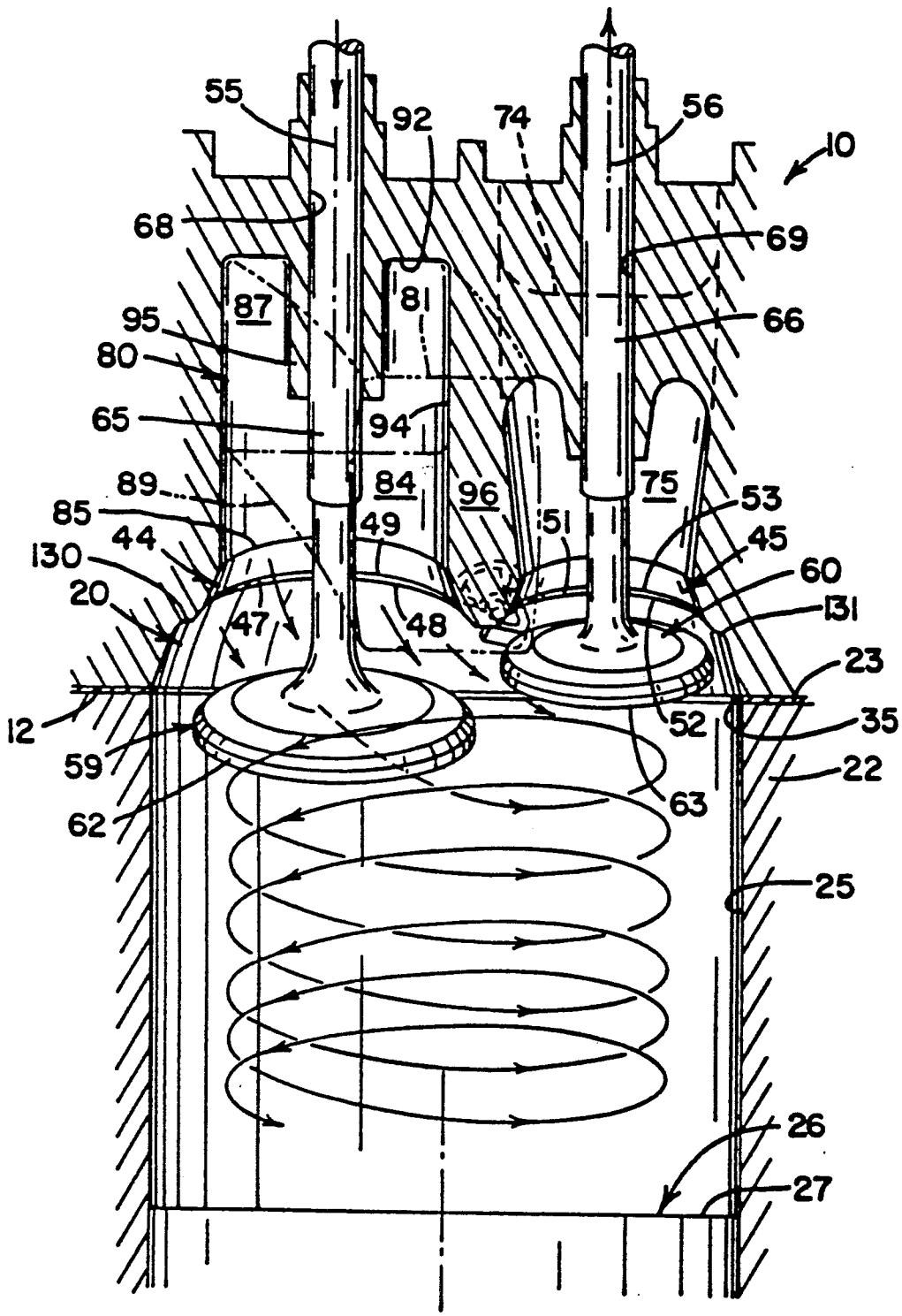
FIG. 8 is a cross-sectional, pictorial schematic view similar to FIG. 7 showing the flow of the air-fuel mixture past the intake valve during the intake stroke of the internal combustion engine.

As best shown in FIG. 8, mounting surface 12 of head 10 is bolted in a conventional manner to short block 22 of the V-8 engine with a head gasket 23 interposed between mounting surface 12 and block 22. When mounted to block 22, combustion chamber 20 is in overlying registry with cylinder 25 containing a reciprocating piston 26 which is shown (and which importantly for the operation of the present invention) to be of the flat head, high performance racing type piston. Flat head 27 of piston 26 cooperates with the shape of combustion chamber 20 to produce a thorough combustion of a fuel-air mixture compressed within combustion chamber 20 during the ignition or combustion cycle stage. The registry or position of combustion chamber 20 with reference to flat head 27 is best shown in FIGS. 2 and 3 wherein a circle 30 indicating the outline of flat head 27 is drawn relative to the overlying relationship of combustion chamber 20. Specific reference may be had to FIG. 3 which shows a direct view into combustion chamber 20. There is shown a slight shift of combustion chamber 20 at reference character 32 relative to circle 30 indicating that combustion chamber 20 is not precisely centered relative to cylinder 25 and piston 26 for reasons which will be hereafter explained.

The shape of combustion chamber 20 forms an essential part of the present invention and will be described in a general sense at this time. Combustion chamber 20 extends into head 10 from an opening in mounting surface 12 defined by a pheripheral edge surface 35 of an especially configured closed shape. Generally, combustion chamber 20 extends inwardly into head 10 from peripheral edge surface 35 in the form or configuration of a wedge shaped cavity. The configuration of the wedge shaped cavity may best be seen by viewing any of the end section views and may be generally defined, for example, with reference to FIG. 4, as comprising a first cavity area tapering inwardly into combustion chamber 20 generally along first cavity area center line 38 and a second cavity area tapering inwardly into combustion chamber 20 along second cavity area center line 40. The first cavity area intersects with the second cavity area at a roof line 42 which represents the deepest point of combustion chamber 20 relative to mounting surface 12 and which is generally not a straight line but more in the nature of an undulating line as it extends from one side to the other side of peripheral edge 35. Actually "line" is a misnomer since combustion chamber 20 is constructed so that the first cavity area is smoothly blended into the second cavity area at the "roof" of the cavity. For explanation purposes, the blended surface can be viewed as a roof line, i.e. 42. First cavity area center line 38 extends or tapers into head 10 at a lesser acute angle relative to mounting surface 12, then does second cavity area center line 40 and thus first cavity area is significantly larger than the second cavity area. In a stock cylinder head the lesser acute angle is about 20°, while in the present invention, an optimum angle of about 17° is used.

Formed in the first cavity area is an intake valve opening 44 and closely adjacent thereto an exhaust valve opening 45. Intake valve opening 44 is defined by a frusto-conical intake valve seat 47 having a major diameter edge 48 and minor diameter edge 49 and exhaust valve opening 45 is similarly defined by a frusto-conical exhaust seat 51 having a major diameter edge 52 and a corresponding minor diameter edge 53. For purposes of the preferred embodiment, head 10 is cast iron with integrally formed intake and exhaust valve seats 47, 51 which are hardened by conventional heat treating processes. Alternatively, head 10 could be cast aluminum with frusto-conical valve seat inserts positioned within appropriately formed recesses in intake and exhaust valve openings 44, 45 is disclosed in our parent patent, U.S. Pat. No. 4,686,948. Intake valve seat 47 is concentrically positioned relative to an intake valve center line 55 while exhaust valve seat 51 is concentrically positioned relative to an exhaust valve center line 56.

Figure 4:
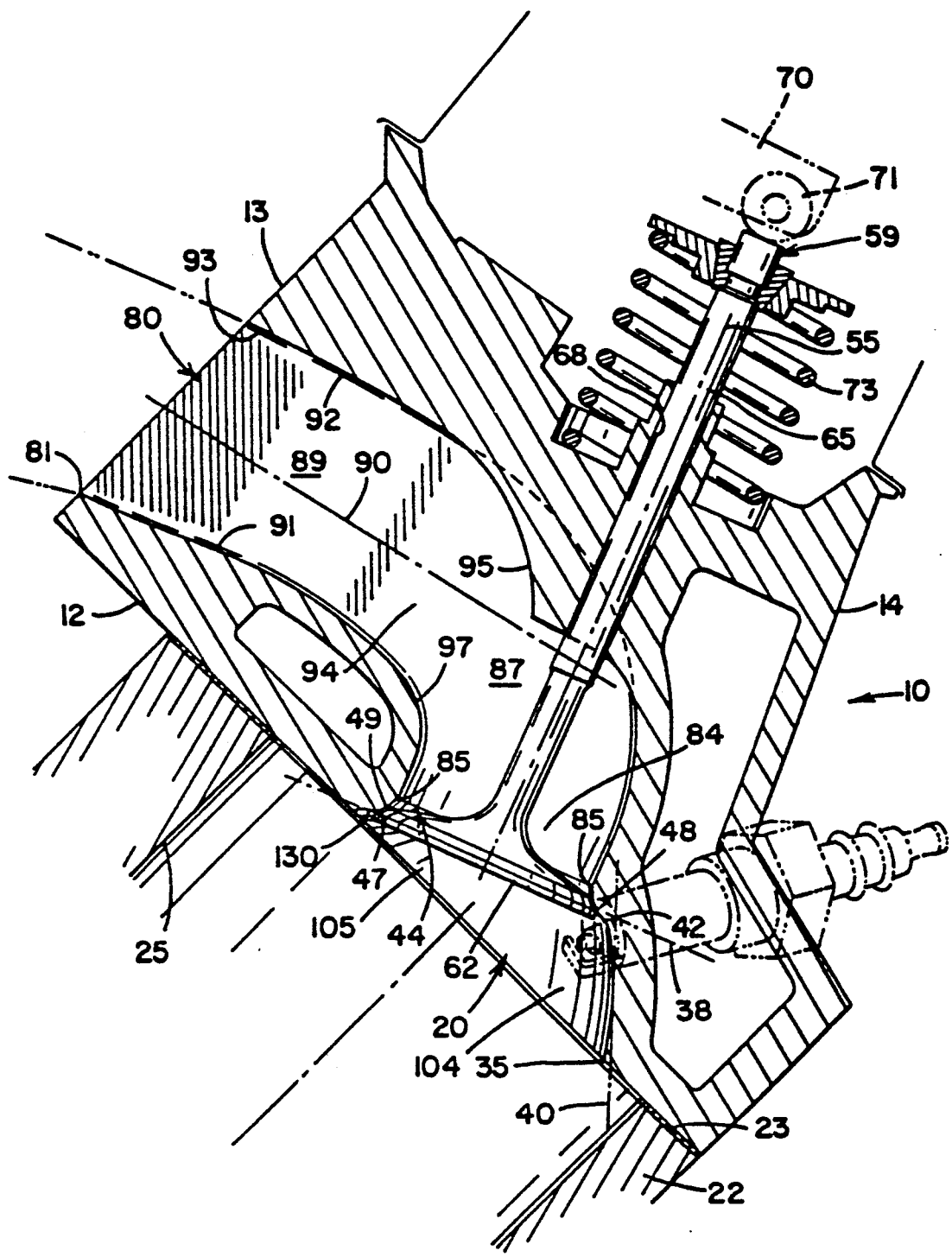
FIG. 4 is a sectional view taken along lines 4—4 of FIG. 3.
Figure 5:
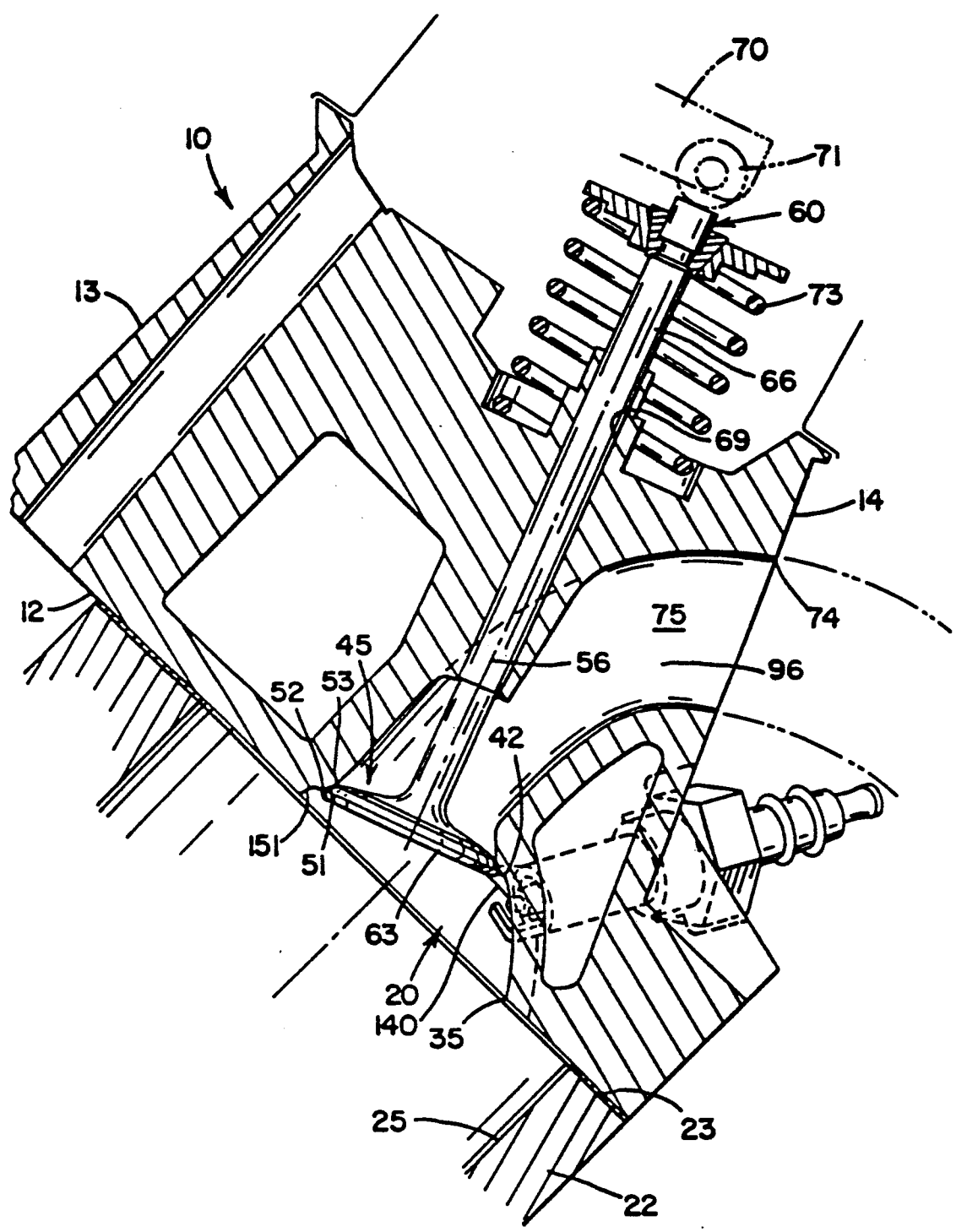
FIG. 5 is a sectional view taken along lines 5—5 of FIG. 3.

As best shown in FIGS. 4 and 5, an intake valve 59 and an exhaust valve 60 is provided for seating against and sealing intake valve seat 47 and exhaust valve seat 51 respectively. Intake and exhaust valves 59, 60 are modified, high performance type poppet valves having circular head portions 62, 63 respectively and stem portions 65, 66 respectively which permit the intake and exhaust valves 59, 60 to reciprocate within intake and exhaust valve guide passages 68, 69 along intake and exhaust valve center lines 55, 56 respectively. Reference should be had to the specifications of our parent patent, U.S. Pat. No. 4,686,948 and to FIGS. 3 and 4 thereof for a description of the valve train which is preferably employed with the present invention for opening and closing intake and exhaust valves 59, 60. Generally, a push rod is provided for each intake and exhaust valve and is actuated preferably in a generally vertical upward and downward direction by a central camshaft positioned in a lower portion of the engine. The push rods actuate a high performance rocker arm 70 which is provided with a roller 71 for pushing downwardly on a valve 59, 60 against the bias of a spring 73 to move the head portion 62, 63 of the valve 59, 60 away from its seat 47, 48. As noted above, this valve arrangement is preferred since it obviates the need of the timing chain to drive overhead camshafts avoiding the power drain associated therewith while providing a more precise, mechanically direct system insuring precise opening and closing of intake and exhaust valves 59, 60 during high speed operation. Such arrangement is also less expensive.

Unlike the valve arrangement disclosed in the parent patent, intake and exhaust valve center lines 55, 56 are parallel with one another and are also parallel with the valve center lines of the other combustion chambers to provide a more efficient in-line valve arrangement permitting the use of a single camshaft referred to above. In addition, and as noted above and unlike the parent patent, intake valve center line 55 has been moved more towards the center of piston head 27 as reflected thus by the space 32 described above. By positioning intake valve 59 closer to the center of combustion chamber 20 in combination with the uniquely formed contour of combustion chamber 20 along with other factors produces better "breathing" and more specifically an improved draw of the fuel-air mixture through intake valve seat 47.

Figure 11:
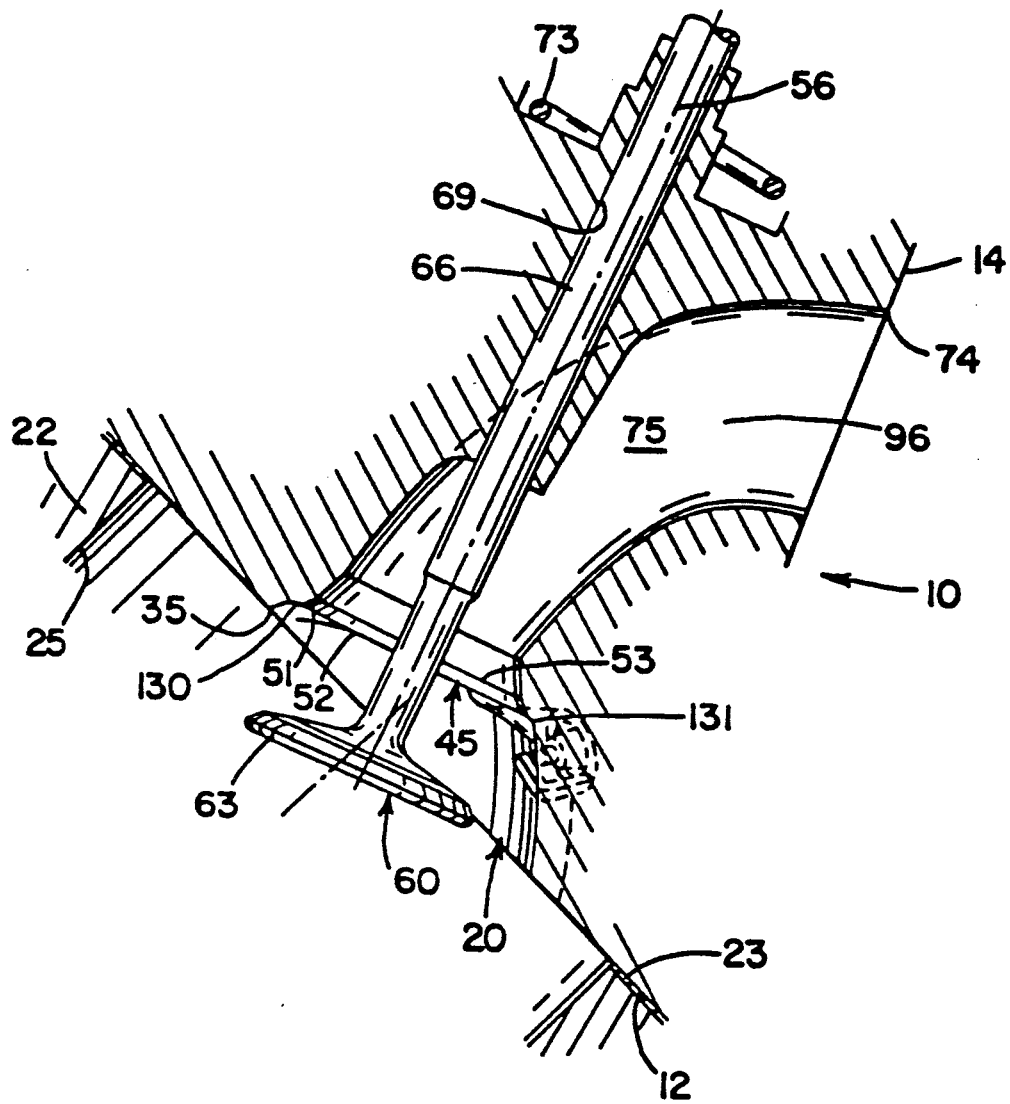
FIG. 11 is an end schematic view of the exhaust valve of the present invention similar to that of the intake valve described in FIG. 10.
Figure 12:
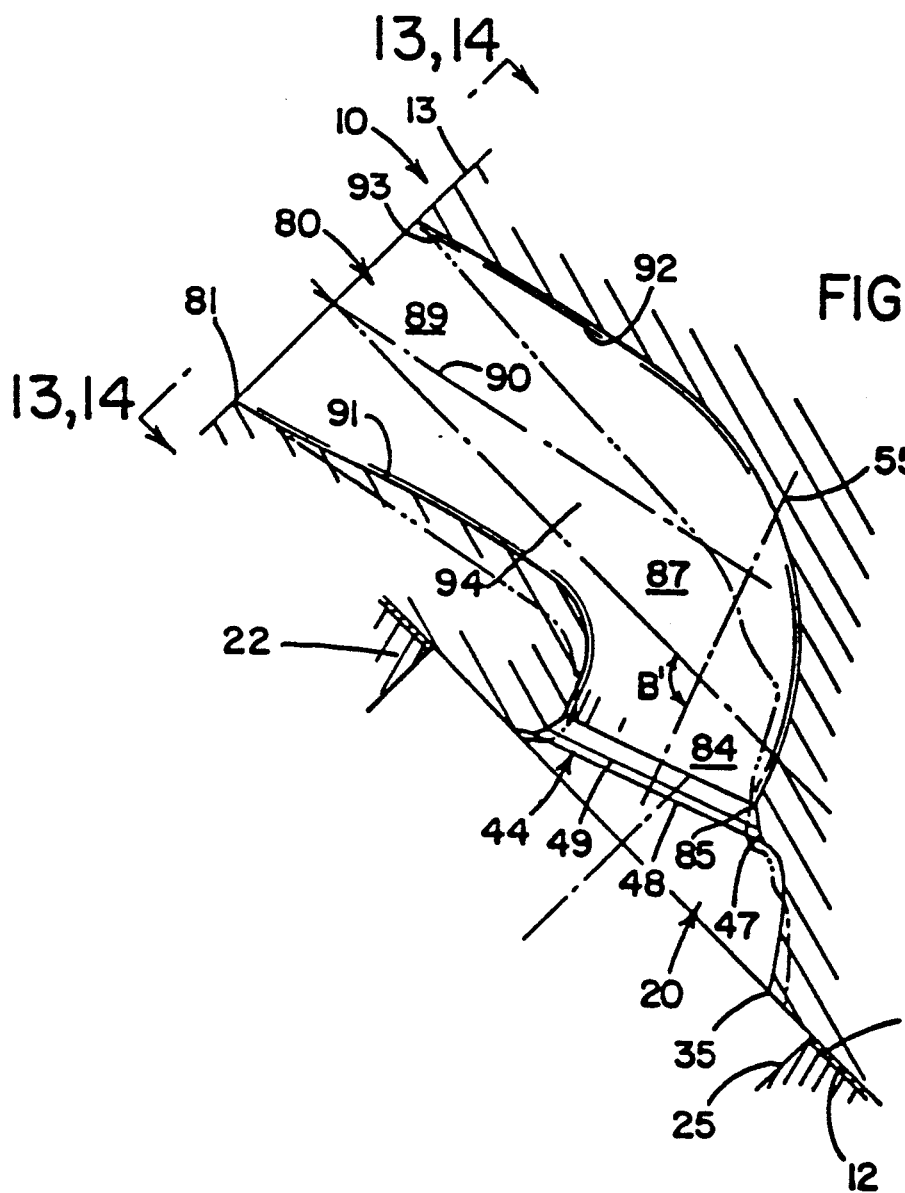
FIG. 12 is a schematic end construction view showing the novel shape of the intake passageway of the present invention as compared to the intake passageway shown in our parent patent.
Figure 16:
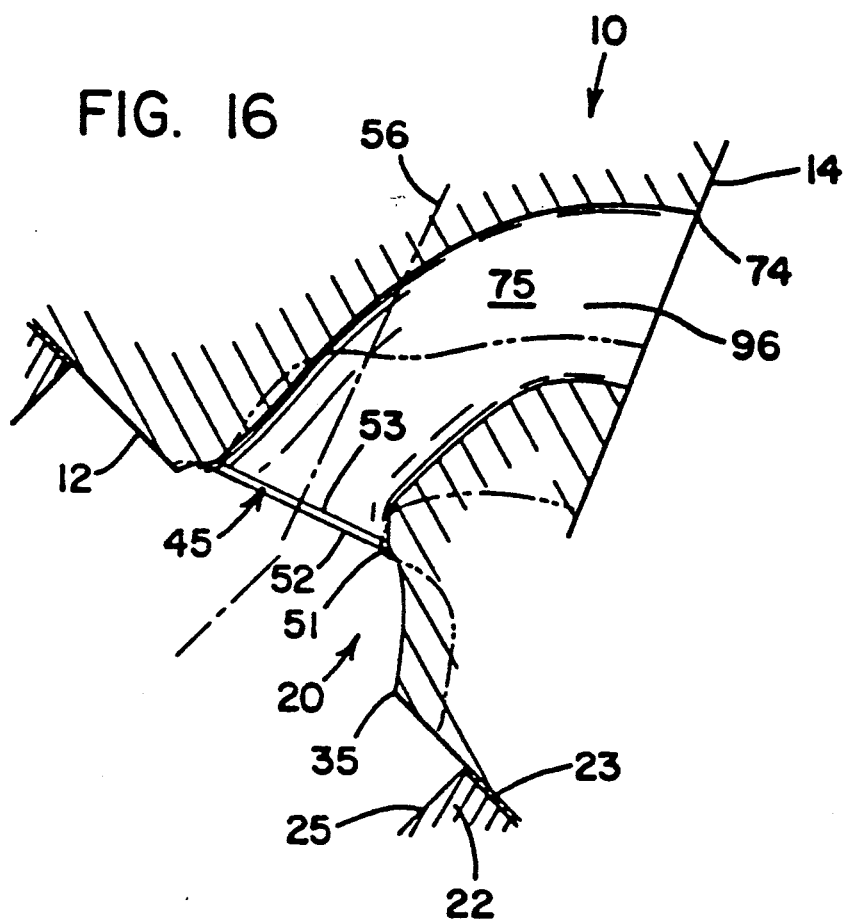
FIG. 16 is an end view of the exhaust passage of the present invention similar to that shown for the intake passageway in FIG. 12 and comparing the exhaust passage with the standard exhaust passage of a production cylinder head often used on an engine to which the present invention is adapted as well as the unique metal build-up between the quenching surface and the valve seat.

Referring now to FIGS. 5, 11 and 16, extending from a rectangular opening 74 formed in exhaust manifold surface 14 and in communication with exhaust valve opening 45 is an exhaust valve passageway 75 and FIG. 16 shows the cross-sectional configuration of exhaust valve passageway 75 contrasted with the phantom line shape of an exhaust passageway now in use with the standard V-8 Ford 460 block engine. The configuration of exhaust valve passageway 75 when used in the preferred embodiment for the Ford 302 engine, is substantially the same as that shown and described in our parent patent, U.S. Pat. No. 4,686,948, and reference should be had to the specifications of our parent patent for a complete and detailed description of the construction and operation of exhaust valve passageway 75. Generally, exhaust valve passageway 75 is opened in the vertical sense as much as possible with gradual bends so as to exhaust, with as little back pressure as possible, the combusted gases from combustion chamber 20 which are funneled by the contoured shape of combustion chamber 10 into exhaust valve passageway 75.

Referring now to FIGS. 4, 10 and 12-15, there is shown an intake passageway 80 originating at a rectilinear opening 81 in intake manifold surface 13 and terminating and in communication with intake valve opening 44. Intake passageway 80 includes a cylindrical base passage 84 beginning at a base line 85 adjacent minor diameter edge 49 of intake valve seat 47 and terminating at a bowl shaped transition passage 87 which in turn blends into trough passage 89 having a generally rectilinear cross-section configuration which, in turn, terminates at intake passageway opening 81. The dimensioning of intake passageway 80 relative to the size of intake valve 59 is essential to the draw or suction of the fuel-air mixture into combustion chamber 20. This is believed to be accomplished by sizing and configuring intake passageway 80 in a manner which assures a sufficient volumetric flow of an air-fuel mixture to impart high performance characteristics to the internal combustion engine while causing a rich-lean fuel-air mixture to be distributed within combustion chamber 20 in a manner which will hereafter be discussed in detail.

Figure 13:
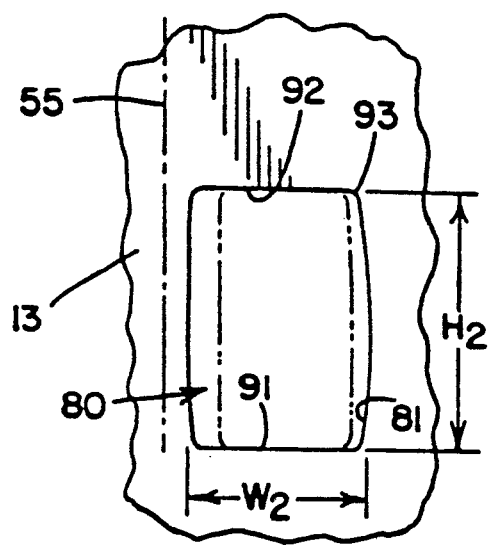
FIG. 13 is a partial side view showing the opening to the intake passageway of the present invention compared to the opening employed in the parent patent and taken along lines 13—13 of FIG. 12.

Trough passage 89 begins at intake opening 81 which as best shown in FIG. 13 is generally rectangular with a height "$H_2$" and a width "$W_2$". The cross-sectional area $A_2$ of intake opening 81 may be defined as "$H_2$"×"$W_2$" and is equal to 72 percent of the intake valve's 59 area. Intake valve's 59 diameter and area is the area of the head portion 62 which seats against frusto-conical valve seat 47 as is known in the art. For purposes of ease of explanation, reference to head portion 62 means the intake valve's diameter and valve area. Intake valve's diameter for the 302 cylinder head described herein is 1.94 in which produces a valve area, Va of 2.95 in $^2$. The width $W_2$ equals 53% of $H_2$ at area $A_2$ and, accordingly, $W_2$ can be calculated as 1.1" and $H_2$ calculated as 1.95". The cross-sectional area of trough passage 89 gradually increases until it reaches a maximum value of $A_1$ at the juncture of trough passage 89 with transition passage 87. The cross-sectioned area of $A_1$ equals intake valve's area Va. $A_1$ is generally rectangular and has a width "$W_1$" and a height $H_1$ and $W_1$ is equal to approximately 97% of $H_1$. Dimensionally, $W_1$ is equal approximately to 1.69" and $H_1$ equals approximately 1.74" making area $A_1$ almost a square. Importantly, the width W of trough passage 89 increases while the height H decreases from $A_2$ to $A_1$.

It is believed that the turbulent flow of the fuel-air mixture drawn through intake passageway 80 is materially reduced by increasing the width W from $A_2$ to $A_1$ to the extent that the height H is actually reduced from $A_2$ to $A_1$. Increasing the cross-sectional area A from $A_2$ to $A_1$ eliminates a venturi effect within trough passage 89 maintaining or even slowing the velocity of the fuel-air flow and tending to promote laminar flow in trough passage 89. To enhance this effect and eliminate any eddy current effect the corners 93 of the rectilinear cross-section of trough passage 89 are rounded. In addition, the floor 91 of trough passage 89 is "belied" out as at 93 to provide a smooth transition. It is thought that as the fuel-air mixture is drawn through trough passage 87, increasing the width W from $A_2$ to $A_1$ tends to stabilize the fuel-air flow and is more significant in this regard than the height H. In order then to minimize turbulence, the height H is actually made larger at $A_2$ so that it can be reduced while the area A expands from $A_1$ to $A_2$, thus permitting a further enlargement of W from $W_2$ to $W_1$. While it cannot be accurately predicted with complete certainty as to what is happening within trough passage 89 and intake passageway 80, various prototype designs indicate the fuel in the fuel-air mixture, and particularly the large size droplets tend to move by gravity from the roof 92 of the trough passage 89 towards the floor 91 to promote a richer fuel-air mixture about floor 91 than about roof 92. In this connection, the valve guide which extends into transition passage 87 has an arcuately shaped boss 95 (FIG. 4) assists in the movement of heavier fuel droplets towards the floor of intake passageway 80. In addition, heat from the adjacent exhaust passageway 75 (FIG. 7) heats the interior or vertically standing wall 94 of trough passage 87 through a thin separating wall 96 thus tending to vaporize the fuel about the wall of intake passageway 80 adjacent the exhaust valve 60. Separating wall 96 is reduced when compared to the parent patent since the intake and exhaust valves 59, 60 are closer to one another. Thus, the fuel-air mixture is lighter or leaner about that portion of the intake passageway's wall adjacent the exhaust valve and heavier or richer about the portion of the intake passageway 80 which is remote from the exhaust valve and the remote portion of intake passageway 80 includes a portion of the floor 91 removed from interior wall 94 of trough passage 89 adjacent exhaust chamber 75.

Base passage 84 is essentially a cylinder defined by a radius $R_3$ which is equal to approximately 45% of intake valve diameter $V_d$ and is concentric with intake valve center line 55 and extends into head 10 a distance as shown as M in FIG. 15 from a valve base line 85. In practice, this distance "M" is 28% of the intake valve diameter $V_d$ and is relatively short limiting somewhat the helical swirling effect of the fuel-air within base passage 84. The cross-sectional area of the base passage 84 is approximately 93% of cross-sectional area $A_1$ and thus there is a slight funnelling or orifacing action as the fuel-air mixture is slightly expanded as it passes through intake valve seat 45 and enters combustion chamber 20 in a manner which will be described later.

Providing a transition between cylindrical base passage 84 and trough passage 89 is bowl-shaped transition passage 87 which as best shown in FIG. 15 includes an outer arcuate surface defined by radius $R_1$ tangential to the end portion of cylindrical base passage portion 84, i.e., at the end of dimension "M", and tangential at the end of trough passage 89, i.e. cross-sectional "$A_1$" and an inner arcuate surface defined by radius $R_2$ tangential also to both trough passage 89 and cylindrical base passage 84. Outer arcuate surface $R_1$ is essentially spherical or bowl shaped as it blends into trough passage 89 and $R_1$ preferably is equal to 2.44 times the radius of the intake valve and $R_2$ is 0.665 times the radius of the intake valve. Both arcs for $R_1$ and $R_2$ are struck or centered on a line passing through a plane which intersects base passage 84 with transition passage 87. Extending into bowl-shaped transition passage 87 as best shown in FIGS. 4 and 14 is a boss portion 95 of intake guide 68 which has a cylindrical shape blending into the roof line i.e., $R_1$ of bowl passage portion 87. As noted above, boss portion 95 of exhaust guide 69 is believed to further enhance the breakup of any fuel droplets directing them towards the floor of intake passageway 80 while smoothly reducing the cross-sectional area of transition passage 89. The flow in trough passage 89 is generally laminar and bowl passage 84 tends to keep the laminar flow so that the distribution of the rich-lean fuel mixture is not disturbed. When the fuel-air flow reaches boss 95, it is actually believed that boss 95 acts as a venturi within transition passage 87 increasing the flow velocity and causing an under pressure zone immediately thereafter in turn causing the fuel-air to expand radially outwardly in base passage 84 and because of the short height of base passage 84, turbulence and excessive mixing therefrom does not radically occur. As the fuel-air expands further as an annulus through intake valve seat 47, it could be characterized as an inner annulus or core of substantially air or a very lean fuel-air mixture with a richer outer annulus of a fuel-air mixture. Importantly, the outer annulus is a lean air-fuel mixture adjacent exhaust valve seat 51 because of the heat from separator wall 96 and the action of trough passage 89, while the outer annulus remote from exhaust valve seat 51 is a rich fuel-air mixture.

The angular relationships between base passage 84, transition passage 87 and trough passage 89 is shown in FIG. 15. The centerline of base passage 55 intersects the centerline 90 of trough passage 89 at an angle of 82° and the angle of roof 92 of trough passage 89 is 84½° relative to a plane perpendicular to trough centerline 90.

Referring now to FIGS. 3, 7, 17 and 18, combustion chamber 20 begins at configured peripheral edge surface 35 which, as is well known for wedge combustion chambers, defines a flat burn control surface known as a quench surface. The configuration of peripheral edge surface 35 is important to the operation of the present invention as is the contour of combustion chamber 20 relative to peripheral edge surface 35. Peripheral edge surface 35 and the contour of combustion chamber 20 will be described with reference to the intake and exhaust valve seats 47, 51 and the relative positions of the first and second cavity areas of combustion chamber 20.

Figure 7:
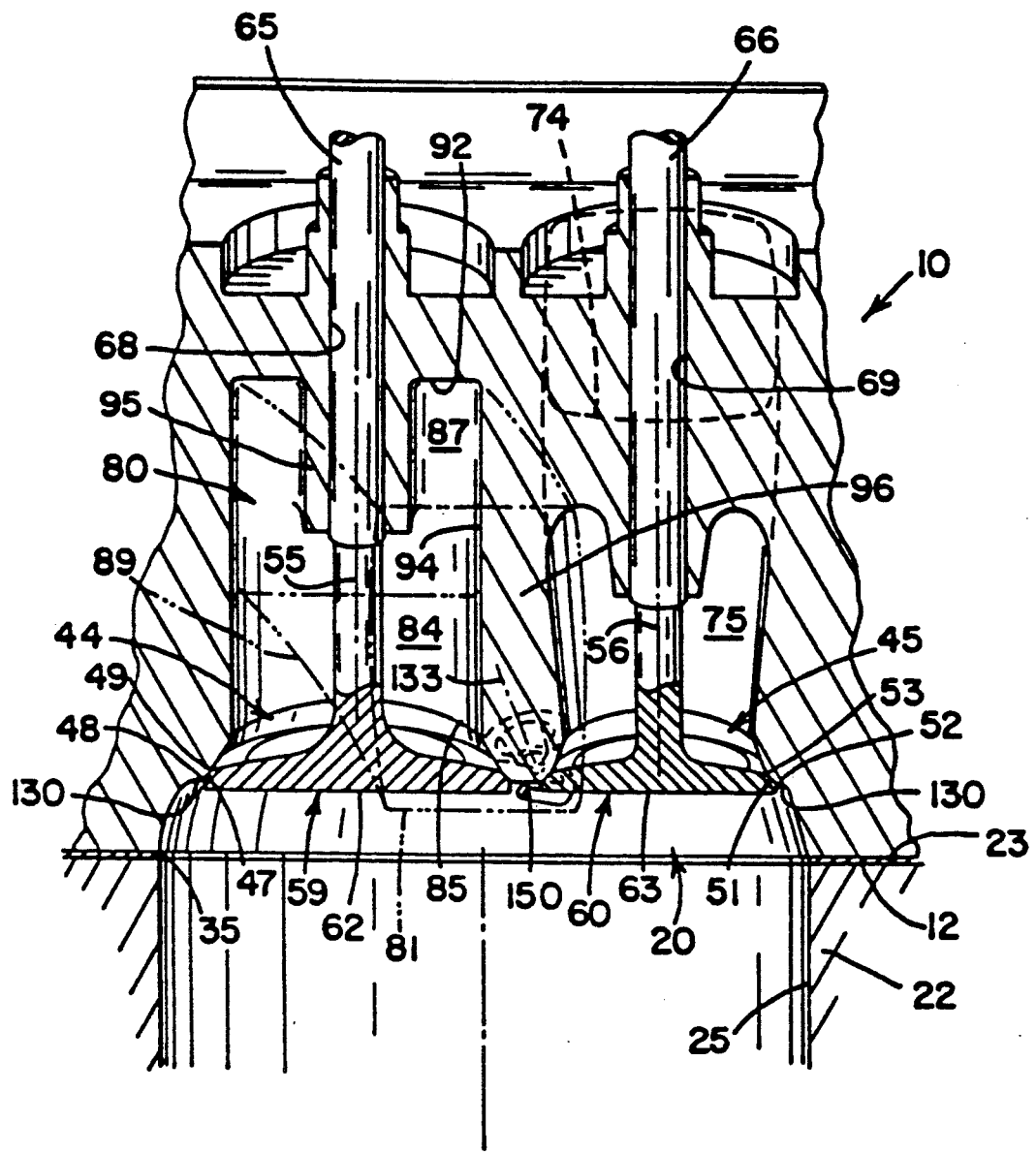
FIG. 7 is a sectional view taken along lines 7—7 of FIG. 3.
Figure 17:
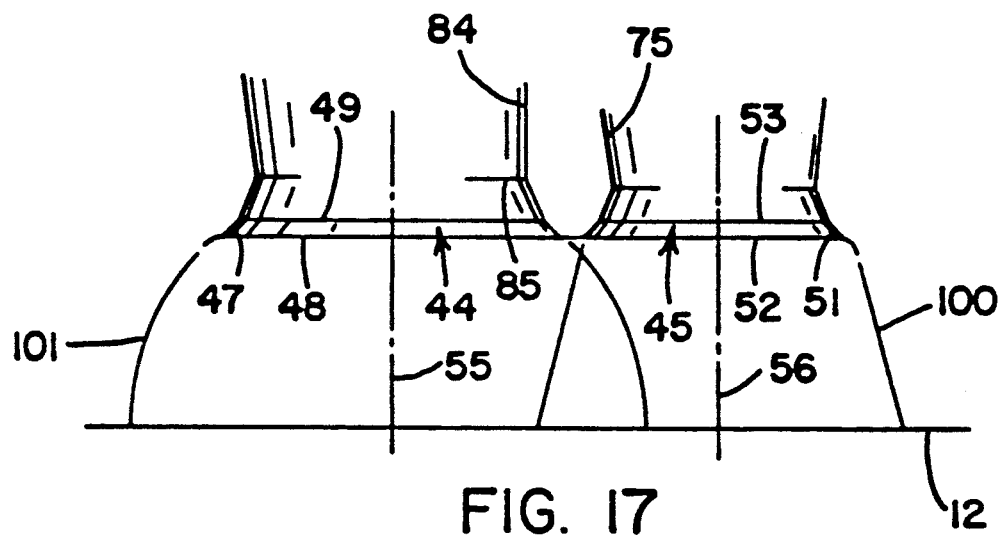
FIG. 17 is a geometric construction view showing the general configuration of the combustion chamber contoured in accordance with the present invention.
Figure 18:
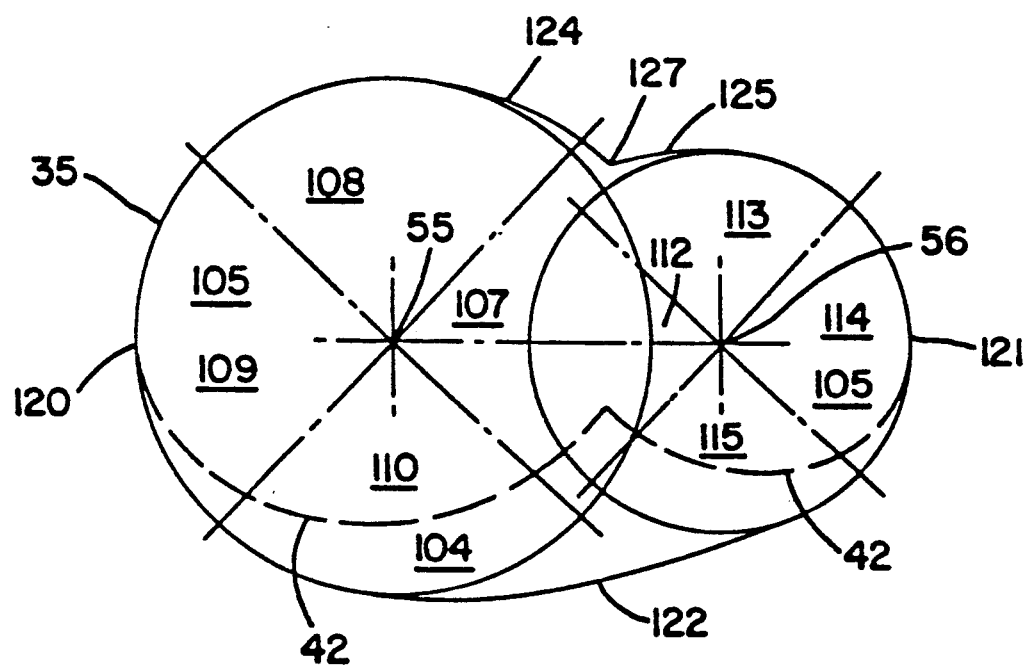
FIG. 18 is a view illustrating the construction of the combustion chamber's opening or quench surface.

FIGS. 17 and 18 illustrate the general scheme used to construct peripheral edge surface 35 with FIG. 17 corresponding to the end view shown in FIG. 7 and FIG. 18 illustrating the general shape of peripheral edge surface 35 and corresponding to the shape shown in FIG. 3. Now with reference to FIG. 17, the general shape of the contour of combustion chamber 20 about exhaust valve seat 51 and at one side of peripheral edge surface 35 is a generally, frusto-conical, funnelling surface 100 similar to that utilized in parent Patent, U.S. Pat. No. 4,686,948. In contrast, a bowl shaped or arcuate unshrouding surface 101 extends from intake valve seat 47 on the opposite side of peripheral edge surface 35. The intersection of funnel surface 100 and unshrouding arcuate surface 101 with mounting surface 12 produces peripheral edge surface 35 shown in FIG. 18 at opposite sides thereof. Unlike our parent patent, valve center lines 55, 56 are parallel to one another. Nevertheless as indicated above both intake valve seat 47 and exhaust valve seat 51 lie in the first cavity area along first cavity area center line 38 which forms an angle of about 15°-20° (20° is the stock angle for exiting heads) and optimally 17° with mounting surface 12 (i.e., see FIG. 21 of parent Patent, U.S. Pat. No. 4,686,948) and thus the height of funneling surface 100 and arcuate unshrouding surface 101 will vary at various points about peripheral edge 35. Because of the inclined cavity area, the actual shape of peripheral edge surface 35 insofar as reference to funnel surface 100 and arcuate surface 101 are concerned is a locus of points determined by the projections of such surface from intake and exhaust valve seats 47, 51 to mounting surface 12 and such surface, while arcuate, will not be truly circular. References to segments of circular edge surface 35 defined as arcuate segments of a given radius means the projection of the radius to mounting surface 12. The approximate location of roof line 42 is superimposed on the plan construction view of peripheral edge 35 shown in FIG. 18 to define the first cavity area 104 falling on one side thereof and the steeper second cavity area 105 on the other side thereof. Also, for definitional purposes, the circular configuration of peripheral edge surface 35 about intake valve center line 55 is divided into quadrants, namely a first quadrant 107, a second quadrant 108, a third quadrant 109 and a fourth quadrant 110. Similarly the configuration of peripheral edge surface 35 about exhaust valve center line 56 is likewise divided into a first quadrant 112, a second quadrant 113, a third quadrant 114 and a fourth quadrant 115. For orientation purposes, fourth quadrant 110 associated with intake valve center line 55 and fourth quadrant 115 associated with exhaust valve center line 56 are substantially in second cavity area 105 while the other quadrants may be viewed as lying in first cavity area 104. In addition, first quadrant 107 associated with intake valve center line 55 and first quadrant 112 associated with exhaust valve center line 56 are adjacent one another.

Peripheral edge surface 35 will now be described as comprising an intake arcuate surface segment 120 resulting from the projection of arcuate unshrouding surface 101 in third quadrant 109 extending approximately midway into the second quadrant 108 and fourth quadrant 110 comprising substantially one side of peripheral edge surface 35. On the opposite side of peripheral edge surface 35 is an exhaust arcuate segment 121 which is a projection of tunnelling surface 100 and similar to intake arcuate surface segment 120, extends substantially about third quadrant 114 of exhaust valve center line 56 and and to approximately midway of the second quadrant 113 and fourth quadrant 115. A tangential arcuate segment 122 smoothly blends intake arcuate segment 120 with exhaust arcuate segment 121 in second cavity area 105. In contrast, extending approximately from the midpoint of second quadrant 108 is a second intake arcuate segment 124 defined by a radius larger than that of intake arcuate segment 120 but tangential to intake arcuate segment 120 within second quadrant 108. Similarly, a second exhaust arcuate segment having a larger radius than exhaust arcuate segment 121 is tangential to exhaust arcuate segment 121 extending from approximately the midpoint of second quadrant 113. Second intake arcuate segment 124 intersects with second exhaust arcuate segment 125 at a relatively sharp V-shaped point defining a velocity protuberance point 127 which is associated with first quadrant 107 of intake valve center line 55 and first quadrant 112 of exhaust valve center line 56. In practice, the "V" shape is slightly blended but is definitely a pointed rather than an undulating configuration and in marked distinction to that of our prior patent.

Figure 6:
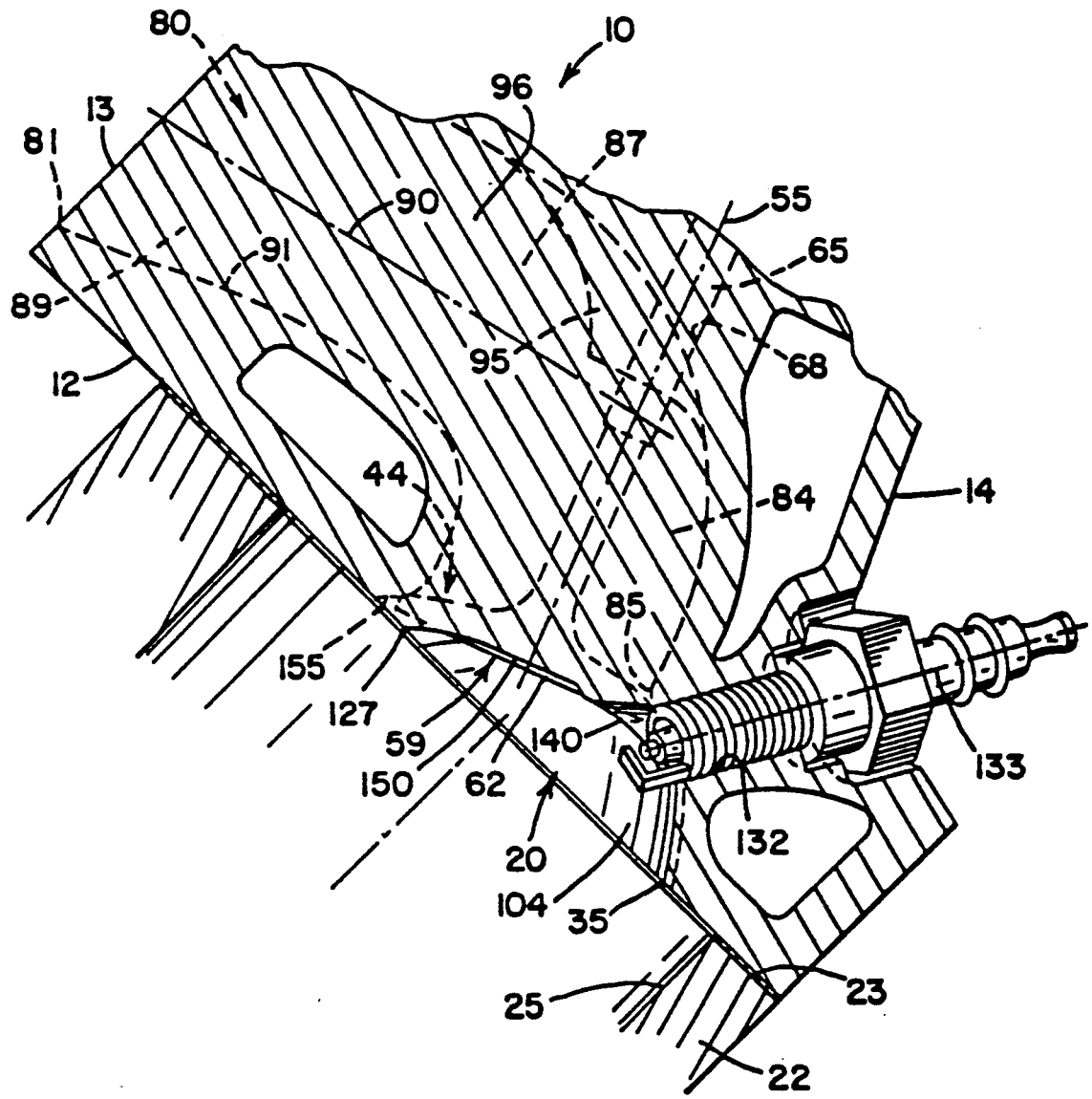
FIG. 6 is a sectional view taken along lines 6—6 of FIG. 3.

Referring now to the end section views shown in FIGS. 4, 5 and 6, the center section view shown in FIG. 7 and the general contour of combustion chamber 20 best shown in FIG. 3, it should be noted that there is a generally flat annular spacing surface 130 extending about intake valve seat 47 and exhaust valve seat 51 and originated from major diameter edge 48 of intake valve seat 47 and major diameter edge 52 of exhaust valve seat 51. The general profile of annular spacing surface 130 is shown by the dash line 131 in FIG. 3. It should be noted that the width of spacing surface 130 varies at different positions relative to the intake and exhaust valve seats 47, 51 for reasons which will be explained. The configuration of combustion chamber 20 between annular spacing surface 130 and peripheral edge surface 35 about exhaust valve seat 51 is that of the frusto-conical funnelling surface 100 to assure the funnelling or shrouding of combustion gases through exhaust valve seat 51 as explained more fully in parent Patent, U.S. Pat. No. 4,686,948. In contrast, the contour of combustion chamber 20 about intake valve seat 47 and between annular spacing surface 130 and peripheral edge 35 is the bowl shape or arcuate unshrouding surface 101 and flat annular surface 130 in the second quadrant 108 of intake valve seat 51 tapers in a helical manner to peripheral edge surface 35.

As best shown in FIG. 3, positioned between intake and exhaust valve seats 47, 51 is spark plug bore 132 within second cavity area 105 having a center line 133. The contour surface 140 of the combustion chamber on the side of spark plug center line 133 adjacent intake valve seat 47 is curved in a concave manner blending with arcuate unshrouding surface 101. On the opposite side of spark plug center line 133 adjacent exhaust valve seat 51, a contoured surface 141 is frusto-conical blending with funnelling surface 100.

Within first quadrant 107 of intake valve seat 47 and first quadrant 112 of exhaust valve seat 51 and specifically with respect to the shape of combustion chamber 20 between intake and exhaust valve seats 47, 51 annular spacing surface 130 at the closest points that as best shown at 150 in FIG. 7. Along a headline 136 extending from velocity protuberance point 127 which is elevated relative to and extends approximately to flat space 150 is a metal buildup on both sides of headline 136. The metal buildup is best shown by the shading in FIG. 3. The exhaust metal buildup 151 on the side of headline 136 adjacent exhaust valve seat 51 and within the first quadrant 112 and a portion of second quadrant 113 is frusto-conical blending into annular spacing surface 130 from a high point at the velocity protuberance point 127 to a low point at flat space 150. On the other side of headline 136 adjacent intake valve seat 47 is a concave, arcuate intake metal buildup 152 similar blending into annular spacing surface 130 in first quadrant 107 and in a portion of second quadrant 108 but along a helical or elliptical line 155. The frusto-conical shape of exhaust mass buildup 151 adjacent exhaust valve seat 51 and emanating from velocity protuberance point 127 funnels or forces the exhaust gases in a shrouded manner to exit exhaust valve seat 51 in a more efficient manner than that of our prior U.S. Pat. No. 4,686,948 since velocity protuberance point 127 is much more pronounced and the metal buildup more inclined not only about headline 136 but also about spark plug bore 132.

The draw of the fuel-air mixture through intake valve seat 47 utilizes a radically different concept than that described in our prior U.S. Pat. No. 4,686,948 and produces dramatic results. What we believe is occurring in combustion chamber 20 based on our tests and experiences is that the unshrouding of the combustion chamber about intake valve seat 47 in the manner described includes a uniform flow of the fuel-air mixture pass intake valve seat 47 which is swirling in a helical manner in combustion chamber 20. The swirl may start in base passage 84 but because of the short height of base passage 84 becomes pronounced within combustion chamber 20, and is believed generally in the direction of arrows shown in FIGS. 8 and 9. For reasons noted in the description of intake passageway 80, the fuel-air mixture is lean adjacent exhaust seat 51 and becomes richer and richer as it reaches the opposite side of intake valve seat 47. While there may be a tendency, because of the helical swirl to drive more fuel-air mixture from intake valve seat's 47 side remote from exhaust valve seat 51, the lighter, lean fuel-air mixture balances out any such tendency and assures, as noted above, uniform flow past intake valve seat 47 or alternatively or in combination, the inner annulus of air or a very lean fuel-air mixture is uniformly pulled past the intake valve seat 47 assuring uniform flow. When the valve overlap condition occurs, two things will occur. First the lean fuel-air mixture will buffer the rich fuel-air mixture and the lean fuel-air mixture will short circuit through exhaust valve seat 51. Secondly, the helical swirl imparted to the flow coupled with the position of the rich fuel-air mixture will drive the rich fuel-air mixture past head 63 of exhaust valve 60. Both features act in combination to significantly dissipate the adverse effects of leaking a significant amount of a fuel-air mixture through exhaust valve seat 51 in a valve overlap condition to improve the efficiency of heat 10.

Thus, the mass flow of the fuel-air mixture passing through intake valve seat 47, from a theoretical consideration, need not be as great as that of prior art arrangements since the volume of the fuel-air mixture available for combustion can remain constant. Alternatively, the volume is increased to result in a higher performance engine. Importantly, since the short circuiting of the fuel-air mixture through exhaust valve seat 51 is minimized, the pollutants otherwise discharged through the exhaust valve because of the valve overlap condition described above does not occur resulting in a more pollution free internal combustion engine. Another incidental benefit resulting from the flow pattern described is that the relatively cool fuel-air mixture acts to cool exhaust valve 60, an important consideration in the field of high performance engines. A still further benefit resulting from the flow pattern of the air-fuel mixture is that the adverse effects of any gasoline droplets resulting from the condition described above is dissipated.

Figure 9:
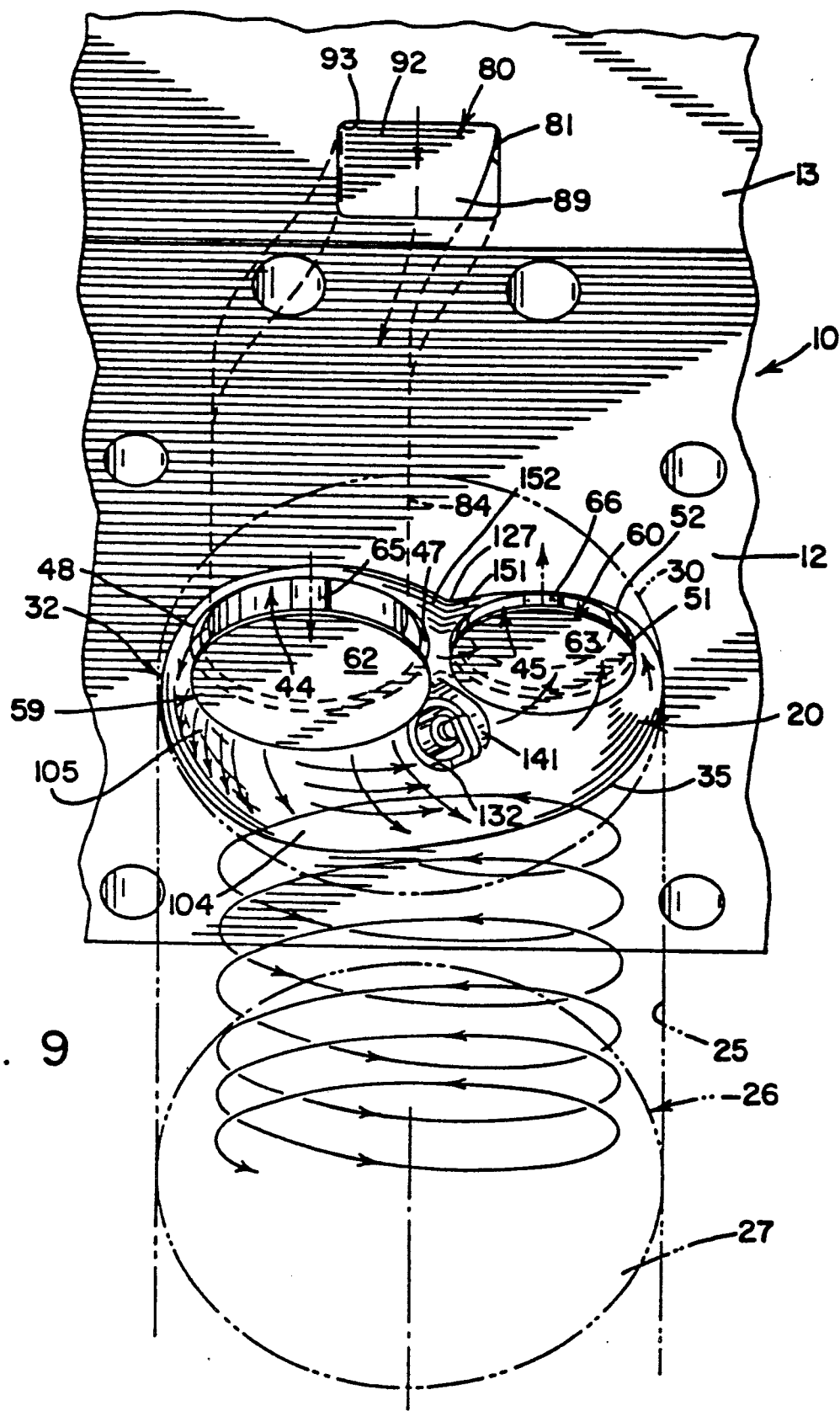
FIG. 9 is an enlarged, partial bottom view looking into the combustion chamber of the present invention and showing the flow of the air-fuel mixture past the intake valve.
Figure 10:
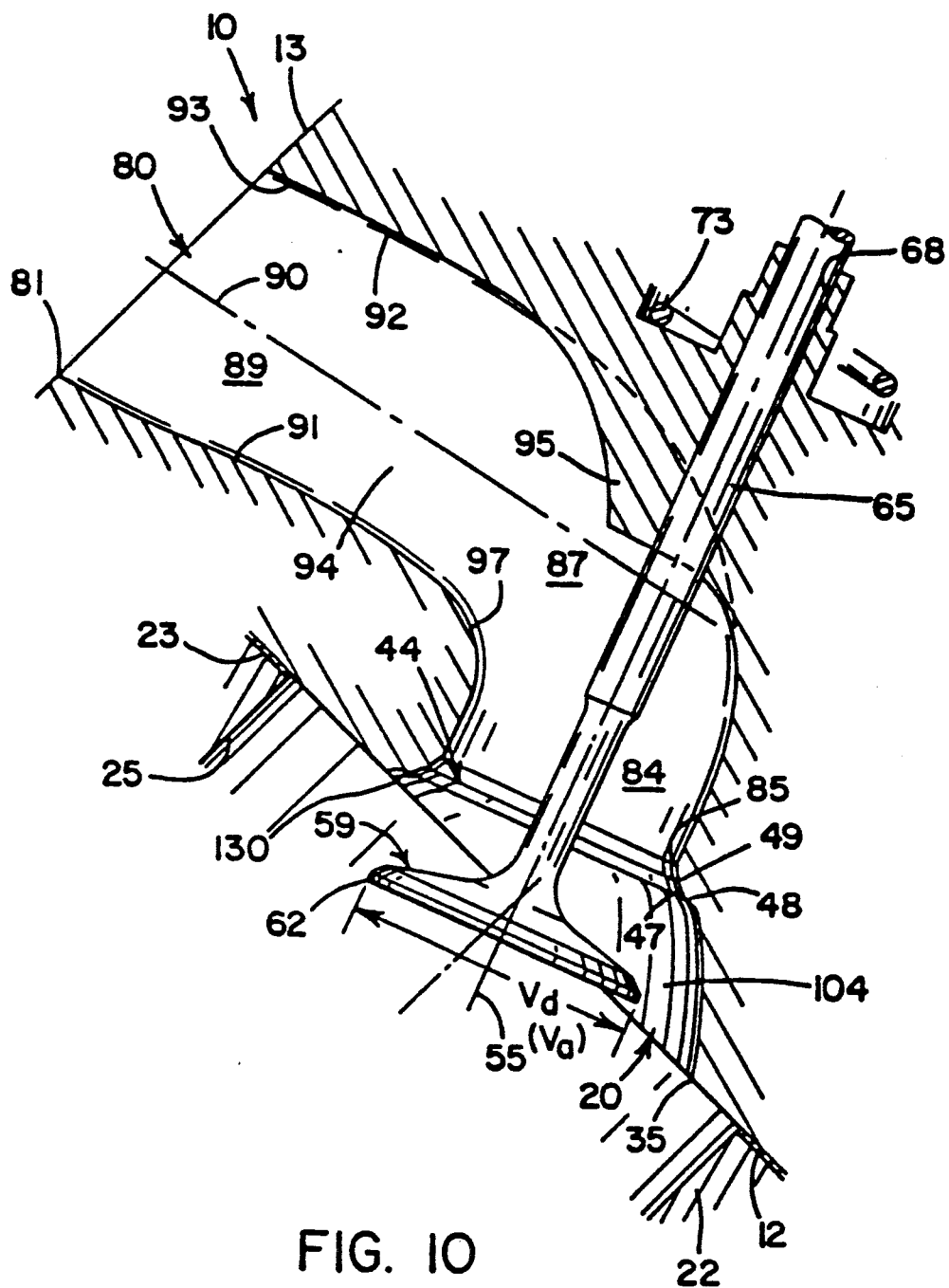
FIG. 10 is a schematic end construction view showing the intake valve in the present invention in the open position and illustrating the novel contoured surfaces of the inner combustion chamber at the intake valve as well as the configuration of the intake valve's passageway.
Figure 19:
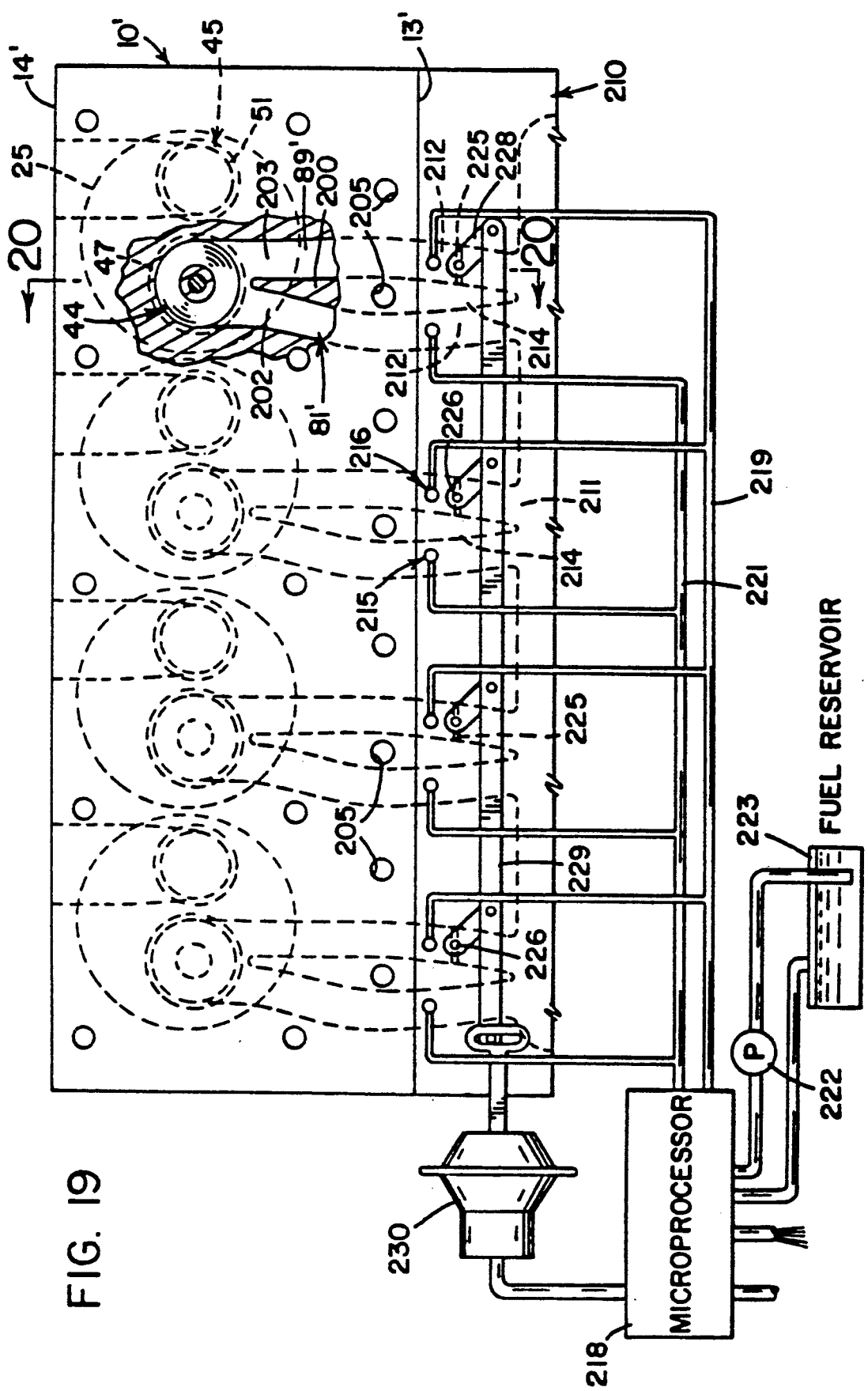
FIG. 19 is a schematic top view of the cylinder head modified for both high speed-low speed operation of the internal combustion engine.
Figure 20:
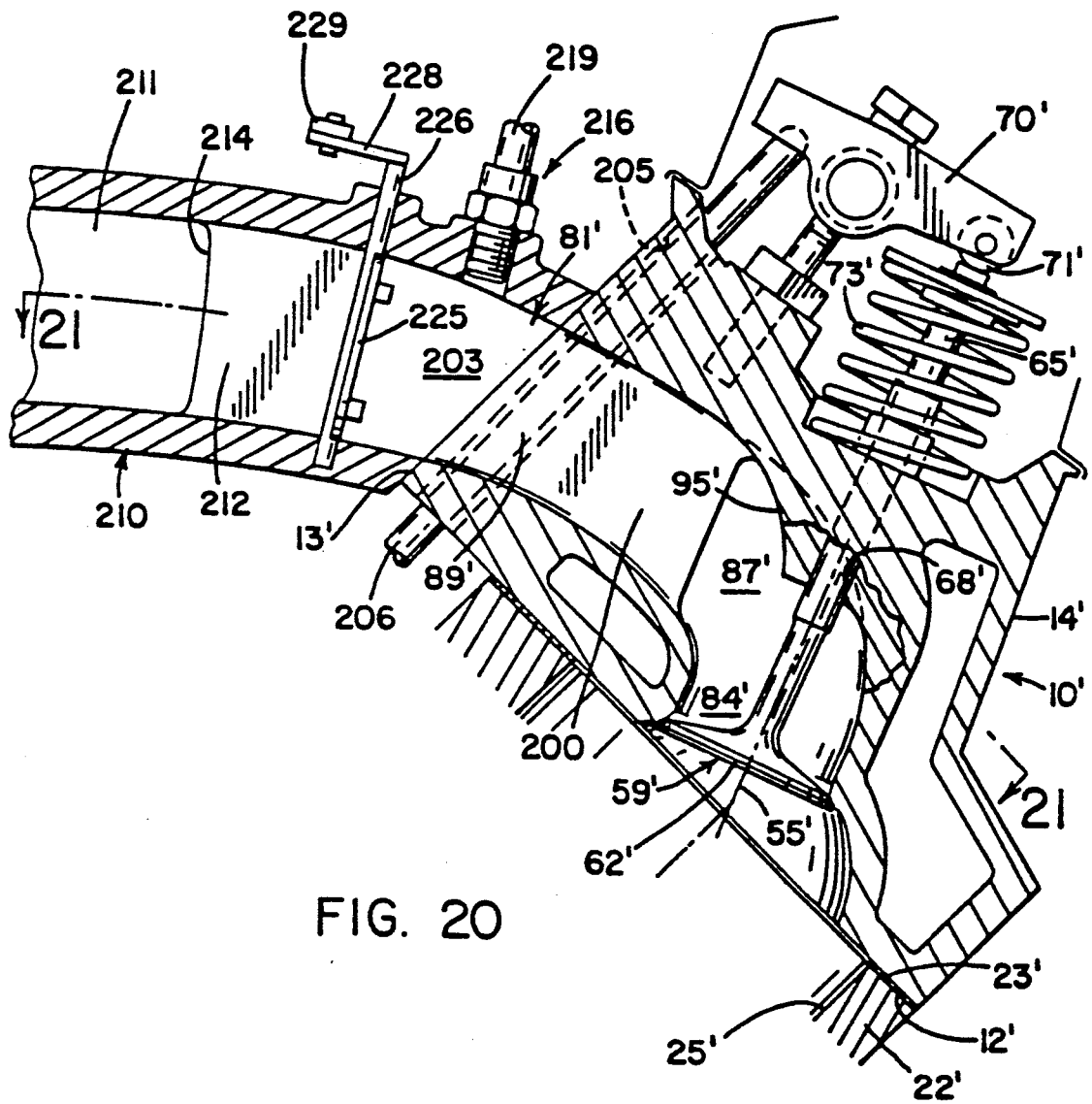
FIG. 20 is a schematic end view of the intake chamber taken along lines 20—20 of FIG. 19.
Figure 21:
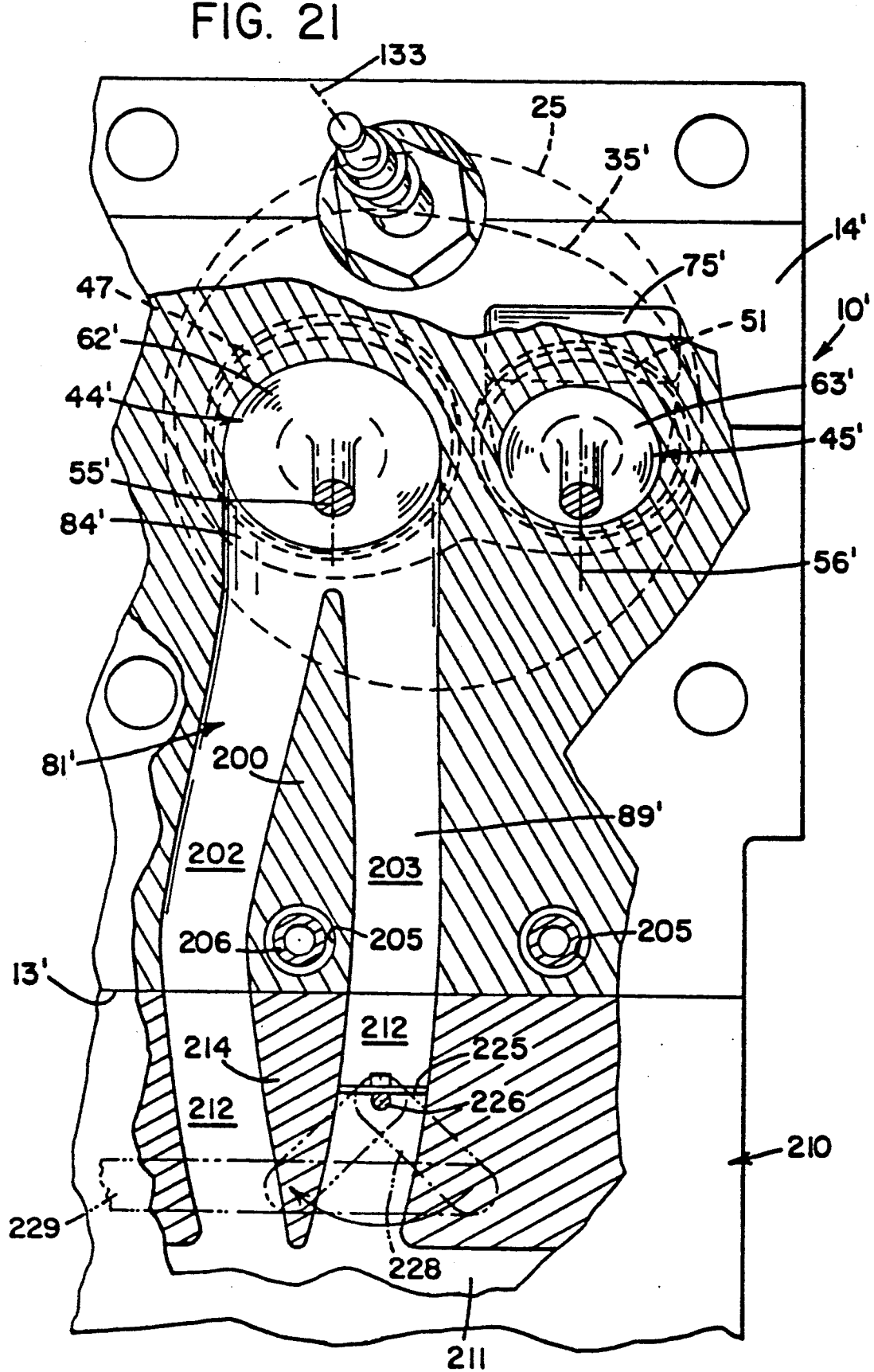
FIG. 21 is a schematic, top section cross-sectional view of the intake chamber of the adaptation shown in FIG. 19 taken along lines 21—21 of FIG. 20.

Referring now to FIGS. 19 through 22, there is shown a modification to head 10 for purposes of enabling the internal combustion engine equipped with heads 10 to generate satisfactory torque characteristics at low operating speeds and reference numbers heretofore used to designate various surfaces, shapes and parts when followed by a prime (') will be used to designate like surfaces, shapes and parts where possible. The in-line arrangement of the intake and exhaust valve openings 47, 51 is shown in FIG. 19 with a principal difference between head 10' of FIG. 19 and head 10 as shown in FIG. 1 being the construction of intake passageway 81'. More specifically, as shown in FIGS. 19 and 21, a bisecting wall 200 divides rectangular passage portion 89' into a first rectangular passage 202 and a second rectangular passage 203 which are equal in cross-sectional area to one another. As indicated, bisecting wall 200 extends to and blends in with boss portion 95' thus effectively extending first and second rectangular passages 202, 203 through transition bowl portion 87' with cylindrical base portion 84' which is identical to cylindrical base portion 84 of the preferred embodiment. Bisecting wall 200 thus enhances the under pressure characteristics of cylindrical base portion 84' considering either rectangular passage 202, 203 singularly when compared with intake passageway 80 of the preferred embodiment. Bisecting wall 200 adjacent intake manifold surface 13' is flared or increased in metal thickness to support a push rod bore 205 in which an intake push rod 206 is reciprocally disposed. As best shown in FIG. 21, push rod bore 205 for intake push rods 206 is slightly offset to one side of intake valve center line 55' in contrast to the push rod bore in the preferred embodiment (which is not shown in the drawings) which is slightly offset to the opposite side of intake valve center line 55 to avoid any obstruction within intake passageway 80. This in turn results in a slight skewing of narrow rectangular passage portion 89 of the preferred embodiment as best shown in FIG. 9. Push rod bores 205 for both the intake push rod 206 and the exhaust push rods are axially aligned with one another as best shown in FIGS. 19 and 21.

Attached to intake manifold surface 13' of head 10' is an intake manifold 210. Intake manifold 210 has a central cavity 211 through which a volume of air is drawn in a known manner and from which extends a plurality (4) of especially configured intake cavities 212. Each intake cavity 212 is configured to match intake passageway opening 81' and includes a diverter wall 214 which matches and joins with bisecting wall 200 to in effect extend first and second rectangular passages 202, 203 into intake cavity 212 of intake manifold 210. Positioned on one side of diverter wall 214 is a primary fuel injector 215 while a secondary fuel injector 216 is positioned on the opposite side of diverter wall 214. A microprocessor 218 meters the flow of fuel through lines 219 to secondary fuel injectors 216 while microprocessor 218 also controls the flow of fuel through lines 221 to primary fuel injectors 216 with a conventional fuel pump 222 downstream of microprocessor 218 drawing fuel from fuel reservoir or gas tank 223 and pressurizing same through lines 219 and 221 to provide a fuel spray in a conventional manner through primary and secondary fuel injectors 215, 216. Since first and second rectangular passages 202, 203 are approximately equal in area, primary and secondary fuel injectors 215, 216 have the same capacity to emit or meter the same amount of fuel into first and second rectangular passages 202, 203 respectively.

Within intake cavity 212 and positioned between secondary fuel injector 216 and central cavity 211 is a butterfly valve 225 which in an open position allows air to flow into second rectangular passage 203 from central cavity 211 while in a closed position prevents any significant flow of air through second rectangular passage 203 in intake passageway 81'. As best shown in FIGS. 19 and 20, butterfly valve 225 is secured to a ratable shaft 226 which in turn is fixed to an intermediate link 228 in turn pinned to an actuator link 229. Actuator link 229 is pinned to all the intermediate links 228 of all butterfly valves 225 and is axially movable along a longitudinal direction by a vacuum actuator 230 in turn controlled by microprocessor 218.

When the internal combustion engine is operating at a high speed, that is in excess of 5,000 rpm, actuator 230 is so positioned that butterfly valve 225 is fully opened and a full metered flow of gasoline is sprayed into first and second rectangular passages 202, 203 through primary and secondary fuel injectors 215, 216 while a full volume of air is drawn through first and second rectangular passages. At a lesser operating speed of the internal combustion engine, vacuum actuator 230 is actuated to close butterfly valve 225 thus preventing air from entering second intake passageway 213 and at the same time microprocessor 218 shuts off fuel to secondary fuel injector 216. While it is possible to vary the opening of butterfly 225 along with an associated increase of the gas metered through secondary fuel injector 216, the on/off operation described is preferred because i) it is simpler to control and ii) using only first rectangular passage 202 insures the development of an adequate back pressure and under pressure zone within intake passageway 80' to produce the highly efficient desired helical swirl pattern described above at low speeds thus producing more torque from the internal combustion engine at lower speeds than that which would otherwise be available.

Figure 22:
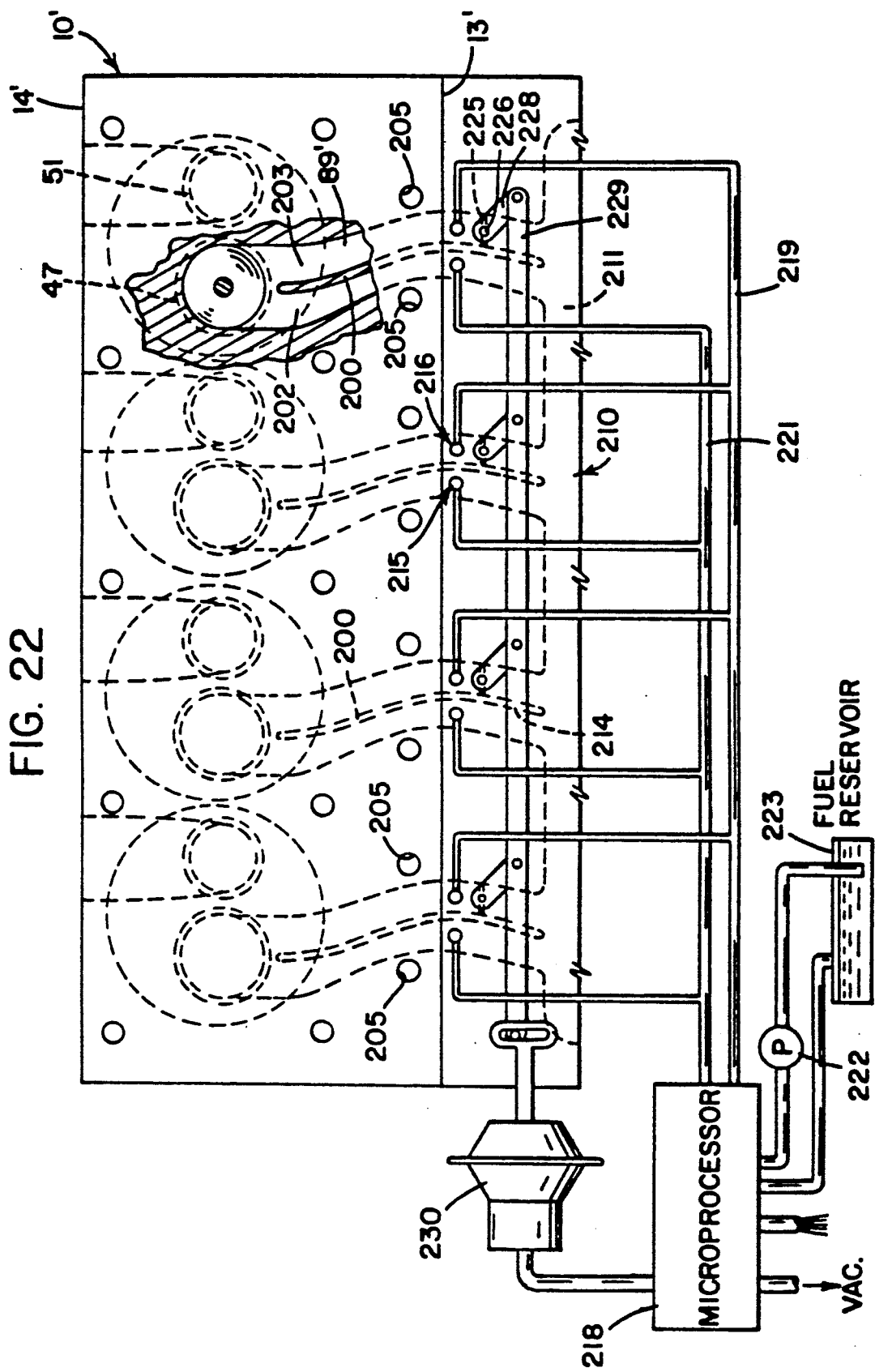
FIG. 22 is a top schematic view similar to FIG. 19 and showing a modification of the intake passageway shown in FIG. 19.

FIG. 22 shows a further modification to the alternative embodiment shown in FIG. 19. In FIG. 22, push rod bores 205 are moved outside of narrowing rectangular passage portion 89' thus resulting in a reduction to the thickness of bisecting wall 200 but also at the same time resulting in a gradually spiral shape of first and second rectangular passages 202, 203. FIG. 22 is merely shown as an alternative configuration which can be employed for first and second rectangular passages 202, 203. However, the configuration shown in FIG. 19 is preferred considering the valve train design and also the preferred flow of a fuel-air mixture afforded by the relative straight first and second rectangular passages 202, 203 of the FIG. 19 embodiment.

With a conventional 302 engine equipped with standard heads, a maximum brake horsepower of 25 occurs at 4,000 rpm and a torque curve is generated which produces 300 lbs torque at 3,200 rpm but which drops rapidly at higher speeds. When the 302 engine was equipped with heads of the present invention maximum brake horsepower of 300 300 occurred at 5,000 rpm. The torque curve generated parallel that of the conventional engine but linearly increased (no drop off) until reaching 350–400 lbs torque at 5,000 rpm.

The present invention has been described with reference to a preferred and alternative embodiment. Obviously, modifications and alterations will suggest themselves to those skilled in the art. It is our intention to include all such modifications and alterations insofar as they come within the scope of the present invention.

Having thus described our invention, the following is now claimed:

1. A cast cylinder head for an internal combustion engine, said head including a flat mounting surface and having for each of several in-line circular piston areas:
   a) a wedge shaped combustion chamber extending from said mounting surface and defined by
      i) an especially configured, closed peripheral edge surface co-planar with said mounting surface and forming the opening of said combustion chamber;
      ii) a concave, contoured first cavity area extending from a continuous first portion of said peripheral edge surface and tapering into said head and away from said mounting surface at a generally inclined first angle;
      iii) a concave, contoured second cavity area extending from the remaining portion of said peripheral edge surface and tapering into said head and away from said mounting surface at a a generally inclined second angle, said second angle greater than said first angle;
      iv) said first cavity area intersecting said second cavity area along a roof line;
   b) a frusto-concial intake valve seat in said first cavity area having a major diameter circular edge surface and a minor diameter circular edge surface concentric with an intake valve axis, said major diameter intake edge spaced closer to said mounting surface than said minor diameter intake edge, said intake valve seat further divided, approximately and for reference purposes, into adjacent sequentially numbered, first, second, third and fourth quadrants, said second and third quadrants generally adjacent said peripheral edge surface, said fourth quadrant generally adjacent said second cavity area;
   c) a frusto-conical exhaust valve seat in said first cavity area having a major diameter circular edge surface and a minor diameter circular edge surface concentric with an exhaust valve axis, said major diameter exhaust edge spaced closer to said mounting surface than said minor diameter exhaust edge, said exhaust valve seat further divided, approximately and for reference purposes, into adjacent, sequentially numbered first, second, third and fourth quadrants, said second and third quadrants generally adjacent said peripheral edge surface, said fourth quadrant generally adjacent said second cavity area and said fourth quadrant of said exhaust valve seat and said first quadrant of said intake valve seat generally adjacent one another;
   d) a spark plug bore in said second cavity generally between said intake valve and said exhaust valve axis;
   e) intake passage means in said head for establishing fluid communication with said intake valve seat and exhaust passage means in said head for establishing fluid communication with said exhaust valve seat;
   f) said first cavity area having an annular exhaust spacing surface concentrically extending from said major diameter exhaust edge in a plane generally perpendicular to said exhaust valve axis and a generally frusto-conical funnelling surface extending from said exhaust spacing surface to said peripheral edge surface about at least portions of said third and fourth quadrants for funnelling exhaust gases through said exhaust valve seat; and
   g) said first cavity area having an annular intake spacing surface concentrically extending from said intake major diameter edge in a plane generally perpendicular to said first axis and a generally arcuate, concave surface extending from said intake spacing surface to said peripheral edge surface about at least portions of said third and fourth quadrants for sucking, in an unshrouded manner, a mixture of fuel and air through said intake valve seat.

2. The cast cylinder head of claim 1 wherein said cast cylinder head has an intake manifold surface extending from one side of said flat mounting surface, said intake passage means including a valve intake passageway extending from said intake manifold surface to and in fluid communication with said intake valve seat, and in combination with said head, valving means associated with said intake passageway for reducing the volume of said intake passageway and correspondingly the air mass drawn into said intake passageway when said internal combustion cylinder is operated at low speeds and increasing the volume of said intake passageway and correspondingly the volume of air mass drawn into said passageway when said internal combustion engine is operated at higher speeds whereby the torque developed by said internal combustion engine is increased at lower operating speeds.

3. The cylinder head combination of claim 2 wherein said valving means includes a partition wall extending the length of said intake passageway and dividing said intake passageway into first and second intake passages, a butterfly valve generally adjacent said intake manifold surface for opening and closing one of said intake passages and microprocessor control means for regulating the position of said butterfly valve.

4. The cylinder head combination of claim 3 wherein said intake valve axis and said exhaust valve axis of each combustion chamber lies on a longitudinal axis extending the length of said cylinder head to define a valve-inline cylinder head, and said partition wall extends generally perpendicular to said longitudinal axis.

5. The cylinder head combination of claim 4 wherein said first and second partitions are of equal volume.

6. The cylinder head combination of claim 5, said combination further including an intake manifold secured to said intake manifold surface, said manifold having a central cavity and for each intake passageway, a secondary cavity in communication therewith, a cavity partition wall in each secondary cavity dividing each secondary cavity into two equal sections, said butterfly valve mounted in one of said secondary cavity sections, and a fuel injector extending into each intake passage.

7. A cast cylinder head in combination with a conventional reciprocating piston, internal combustion engine using a fuel-air mixture, said head having at least one wedge-shaped, open ended combustion chamber overlying a piston containing cylinder in said engine, intake valve means including an intake valve seat in said combustion chamber for opening and closing an intake valve, exhaust valve means including an exhaust valve seat in said combustion chamber adjacent said intake valve for opening and closing an exhaust valve, said intake valve means including intake passage means between said intake valve seat and the intake manifold of said engine for diverting a majority of fuel in said fuel-air mixture through a portion of said intake valve seat remote from said exhaust valve seat during the suction stroke of said engine to minimize any tendency of the fuel in the combustion chamber to escape through said exhaust valve seat prior to said exhaust valve firmly seating against said exhaust valve seat thus improving the efficiency of said engine.

8. The case cylinder head-engine combination of claim 7 further including unshrouding means formed in said combustion chamber and associated with said intake valve seat for, in combination with said intake passage means, drawing said air in a substantially uniform, helical swirling manner through said intake valve seat during said engine's suction stroke whereby a lean fuel-air mixture is adjacent said exhaust valve seat and a richer fuel-air mixture is adjacent said lean fuel-air mixture and removed from said exhaust valve seat.

9. The cast cylinder head-engine combination of claim 8 further including said cylinder head having a flat mounting surface with a peripheral edge opening defining said open end of said combustion chamber;

said intake valve seat having a portion thereof closely adjacent said peripheral edge opening at one side thereof;

said exhaust valve seat having a portion thereof closely adjacent said peripheral edge opening at the opposite side thereof;

said unshrouding means further including said adjacent portion of said intake valve spaced further away from said peripheral edge opening than said adjacent portion of said exhaust valve.

10. The cast cylinder head-engine combination of claim 9 wherein the center of said combustion chamber is offset from the center of said cylinder, said peripheral edge opening tangential to said cylinder at one overlying point thereof adjacent said intake valve and spaced from said cylinder at a second point diametrically opposite said overlying tangential point.

11. The cast cylinder head-engine combination of claim 7 wherein said cylinder head has a generally rectilinear flat mounting surface with a peripheral edge opening defining said open end of said combustion chamber and an intake manifold surface extending from one side of said flat mounting surface, said intake valve means including said head having an intake valve passageway extending from a generally rectilinear opening in said intake manifold surface to said intake valve seat and including a trough passage having a generally rectilinear cross-section configuration extending from said intake manifold opening, a cylindrical base passage extending from said intake valve seat and a bowl-shaped transition passage between said trough passage and said base passage, the cross-sectional area of said intake valve passageway at the intersection of said trough passage with said transition passage approximately equal to the areas of the head of said intake valve.

12. The cylinder head-engine combination of claim 11 wherein the cross-sectional area of said generally rectangular opening in said intake manifold surface is equal to approxiamtely 70-75% of said cross-sectional area at the intersection of said trough and transition passages.

13. The cylinder head-engine combination of claim 11 wherein said generally rectangular cross-sectional configuration at the intersection of said trough passage and said transition passage has a width equal to about 97% of the height.

14. The cylinder head-engine combination of claim 13 wherein said generally rectangular opening in said intake manifold surface has a width equal approximately to 53% of the height of said rectangular opening and equal approximately to 87% of the diameter of said intake valve, the width of said trough passage gradually increasing from said opening to said intersection between said trough passage and said transition passage while the height of said trough passage is gradually reduced.

15. The cylinder head-engine combination of claim 14 wherein the diameter of said cylindrical base portion is approximately equal to 90% of the diameter of the head of said intake valve.

16. The cylinder head-engine combination of claim 15 wherein the length of said base portion is approximately equal to 29% of the diameter of the head of said intake valve.

17. The cylinder head-engine combination of claim 16, wherein said base passage has a generally vertically extending centerline co-incident with the centerline of said intake valve and said trough passage has a generally longitudinally extending centerline intersecting said base passage at an acute angle of about 82°.

18. The cylinder head-engine combination of claim 17 wherein said transition passage has an outer spherical surface and an inner spherical surface, said outer spherical surface defined by an arc having a radius approximately equal to 2.44 times longer than one-half the diameter of the head of said intake valve and centered on a line passing through the intersection of said base passage with said transition passage.

19. The cylinder head-engine combination of claim 18 wherein said inner spherical surface is defined by an arc having a radius approximately equal to 0.66 times longer than one-half the diameter of the head of said intake valve and centered on a line passing through the intersections of said base passage with said transition passage.

20. The cylinder head-engine combination of claim 11 wherein the diameter of said cylindrical base portion is approximately equal to 90% of the diameter of the head of said intake valve.

21. The cylinder head-engine combination of claim 20 wherein the length of said base portion is approximately equal to 29% of the diameter of the head of said intake valve.

22. The cylinder head-engine combination of claim 21 wherein said base passage has a generally vertically extending centerline co-incident with the centerline of said intake valve and said trough passage has a generally longitudinally extending centerline intersecting said base passage at an acute angle of about 82°.

23. The cylinder head-engine combination of claim 22 wherein said transition passage has an outer spherical surface and an inner spherical surface, said outer spherical surface defined by an arc having a radius approximately equal to 2.44 times longer than one-half the diameter of the head of said intake valve and centered on a line passing through the intersection of said base passage with said transition passage.

24. The cylinder head-engine combination of claim 23 wherein said inner spherical surface is defined by an arc having a radius approximately equal to 0.66 times longer than one-half the diameter of the head of said intake valve and centered on a line passing through the intersections of said base passage with said transition passage.

25. The cylinder head-engine combination of claim 11 wherein said transition passage has an outer spherical surface and an inner spherical surface, said outer spherical surface defined by an arc having a radius approximately equal to 2.44 times longer than one-half the diameter of the head of said intake valve and centered on a line passing through the intersection of said base passage with said transition passage.

26. The cylinder head-engine combination of claim 24 wherein said inner spherical surface is defined by an arc having a radius approximately equal to 0.66 times longer than one-half the diameter of the head of said intake valve and centered on a line passing through the intersections of said base passage with said transition passage.

27. A valve in-line, cast cylinder head for a high performance internal combustion engine using a mixture of air and fuel with a valve train partially disposed within said head; said valve train including for each cylinder of said combustion engine only one intake valve of the poppet type and one exhaust valve of the poppet type, each valve having a stem portion concentric with a valve axis and a head portion and axially movable along said valve axis from an open position to a closed position, said head comprising:

a flat mounting surface adapted to overlie a plurality of cylinders in said combustion engine;

said head, for each overlaid cylinder, having a wedge shaped, generally closed end combustion chamber defined by a wall surface formed therein and extending from an opening in said mounting surface, a frusto-conical intake valve seat in said combustion chamber having a first axis coincident with said intake valve axis, said intake valve's head portion seated against said intake seat in said closed position and moved toward said opening in said open position; a frustoconical exhaust valve seat in said combustion chamber having a second axis coincident with said exhaust valve axis, said exhaust valve's head portion seated against said exhaust seat in said closed position and moved towards said opening in said open position, said first and second axis generally parallel to one another;

intake passage means including an especially configured intake passageway formed in said head and extending with increasing cross-sectional area from an intake opening in said head to said intake valve seat for preventing fuel droplets from being deposited in said combustion chamber; and contouring means formed in said wall of said combustion chamber for minimizing any tendency of said fuel and air mixture from entering said exhaust valve seat should said exhaust valve head portion be not completely seated against said exhaust valve seat when said intake valve head is not seated against said intake valve seat, said contouring means including an added mass of metal in the form of a protuberance formed in said combustion wall and extending from a point generally midway between the position whereat said valve seats are closest one another in an adjacent relationship to the edge of said combustion chamber's opening whereat said opening is generally closest to said intake valve seat, said added mass gradually blending into said chamber from said point to said edge opening.

28. The cylinder head of claim 27 further including said head having, for each combustion chamber, an intake valve passageway extending from a generally rectangular intake opening in said intake surface to said intake valve seat; said intake passageway including three passages, a cylindrical base passage concentric with said intake valve axis and extending from said intake valve seat into said first cavity, an expanding, generally rectangular trough passage extending from said intake opening and a bowl-shaped, transition passage connecting said trough passage with said base passage, the cross-sectional area of said intake valve passageway at the intersection of said trough passage with said transition passage approximately equal to the area of the head of said intake valve.

29. The cylinder head of claim 28 wherein the cross-sectional area of said generally rectangular opening in said intake manifold surface is equal to approximately 70–75% of said cross-sectional area at the intersection of said trough and transition passages.

30. The cylinder head of claim 29 wherein the width of said trough passage gradually increases from said opening to said intersection between said trough passage and said transition passage while the height of said trough passage is gradually reduced whereby said heavier fuel-air particles tend to drift through said intake valve seat at a position removed from said exhaust valve seat.

* * * * *